(12) United States Patent
Zheng et al.

(10) Patent No.: US 11,212,823 B2
(45) Date of Patent: Dec. 28, 2021

(54) METHOD AND APPARATUS FOR TRANSMITTING UPLINK CONTROL INFORMATION

(71) Applicant: Huawei Technologies Co., Ltd., Shenzhen (CN)

(72) Inventors: Juan Zheng, Beijing (CN); Lei Guan, Beijing (CN); Zhiyu Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/188,507

(22) Filed: Nov. 13, 2018

(65) Prior Publication Data

US 2019/0082452 A1 Mar. 14, 2019

Related U.S. Application Data

(63) Continuation of application No. PCT/CN2016/082123, filed on May 13, 2016.

(51) Int. Cl.
*H04W 72/12* (2009.01)
*H04L 5/00* (2006.01)
*H04W 74/08* (2009.01)

(52) U.S. Cl.
CPC ....... *H04W 72/1268* (2013.01); *H04L 5/0007* (2013.01); *H04W 72/1284* (2013.01);
(Continued)

(58) Field of Classification Search
CPC ......... H04W 72/1268; H04W 72/1284; H04W 72/1289; H04W 72/1278; H04W 74/0808; H04L 5/0007
See application file for complete search history.

(56) References Cited

U.S. PATENT DOCUMENTS 10,187,187 B2 * 1/2019 Dinan ................... H04L 5/0048
2016/0066343 A1 * 3/2016 Lin ....................... H04L 5/0044
370/280

(Continued)

FOREIGN PATENT DOCUMENTS

CN 104105129 A 10/2014
CN 104113924 A 10/2014
(Continued)

OTHER PUBLICATIONS

Huawei, et al., "Discussion on CCA Gap and Symbol Position for PUSCH and SRS for eLAA," 3GPP TSG RAN WG1 Meeting #84bis, R1-162131, Apr. 11-15, 2016, 5 pages, Busan, Korea.
Samsung, "Discussion on Multi-Subframe Scheduling for eLAA," 3GPP TSG RAN WG1 #84bis, R1-162664, Apr. 11-15, 2016, 3 pages, Busan, Korea.
(Continued)

*Primary Examiner* — Habte Mered
(74) *Attorney, Agent, or Firm* — Slater Matsil, LLP

(57) ABSTRACT

A method for transmitting uplink control information includes: receiving, by a terminal device, scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information; determining, by the terminal device, in the M uplink subframes, an uplink subframe for carrying the uplink control information, where the determined uplink subframe is a subframe other than a first subframe in the M uplink subframes, and the first subframe is a first uplink subframe in the M uplink subframes; and sending, by the terminal device, the uplink control information in the determined uplink subframe.

18 Claims, 16 Drawing Sheets

(52) U.S. Cl.
CPC .... *H04W 72/1289* (2013.01); *H04W 72/1278* (2013.01); *H04W 74/0808* (2013.01)

(56) References Cited

U.S. PATENT DOCUMENTS

| | | | | |
|---|---|---|---|---|
| 2016/0095104 A1* | 3/2016 | Chen | ................... | H04L 1/1854 370/329 |
| 2016/0095134 A1* | 3/2016 | Chen | ................... | H04L 1/1822 370/336 |
| 2016/0360525 A1* | 12/2016 | Cheng | ................ | H04L 27/0006 |
| 2017/0202022 A1* | 7/2017 | Kannan | ................ | H04W 72/14 |
| 2018/0367282 A1* | 12/2018 | Li | ................... | H04W 72/0446 |

FOREIGN PATENT DOCUMENTS

| | | |
|---|---|---|
| CN | 104253677 A | 12/2014 |
| CN | 104619035 A | 5/2015 |
| JP | 2019515528 A | 6/2019 |
| WO | 2014208924 A1 | 12/2014 |
| WO | 2017172036 A1 | 10/2017 |

OTHER PUBLICATIONS

R1-160557 Samsung, "Discussion on multi-subframe scheduling for UL LAA",3GPP TSG RAN WG1 Meeting #84,St Julian's, Malta, Feb. 15-19, 2016, 2 pages.

3GPP TS 36.213 V13.1.1(Mar. 2016), 3rd Generation Partnership Project;Technical Specification Group Radio Access Network;Evolved Universal Terrestrial Radio Access (E-UTRA); Physical layer procedures(Release 13), Mar. 2016. 361 pages.

3GPP TS 36.212 V13.1.0 (Mar. 2016),3rd Generation Partnership Project;Technical Specification Group Radio Access Network;Evolved Universal Terrestrial Radio Access (E-UTRA);Multiplexing and channel coding(Release 13),129 pages.

R1-162937 MediaTek Inc., "Control channel design for eLAA",3GPP TSG RAN WG1 Meeting #84bis, Busan, Korea, Apr. 11-15, 2016, 6 pages.

LG Electronics, Multi-subframe scheduling in LAA [online], 3GPP TSG-RAN WG1#84bis, 3GPP, Apr. 15, 2016, R1-162466, Search Date: Sep. 27, 2019, Internet URL: http://www.3gpp.org/ftp/tsg_ran/WG1_RL1/TSGR1_84b/Docs/R1-162466.zip>, 5 pages.

ZTE Microelectronics Technology, et al., "Discussion on UCI transmission on an LAA SCell", 3GPP TSG RAN WG1 Meeting #84 bis, R1-162325, Apr. 11-15, 2016, 4 pages, Busan, Korea.

* cited by examiner

METHOD AND APPARATUS FOR TRANSMITTING UPLINK CONTROL INFORMATION

CROSS-REFERENCE TO RELATED APPLICATIONS

This application is a continuation of International Patent Disclosure No. PCT/CN2016/082123, filed on May 13, 2016, which application is hereby incorporated herein by reference.

TECHNICAL FIELD

The present disclosure relates to the field of wireless communications, and in particular, to a method and an apparatus for transmitting uplink control information.

BACKGROUND

A licensed-assisted access using Long Term Evolution (LAA-LTE) system may use a 5 GHz unlicensed spectrum (also referred to as the unlicensed spectrum) to extend existing LTE services, e.g., use the unlicensed spectrum to carry some data services in an LTE system. Resource sharing on an unlicensed spectrum includes only limitations on indicators such as transmit power and out-of-band leakage are specified for use of a specific spectrum, so as to ensure a basic requirement for coexistence of multiple devices jointly using the unlicensed spectrum, without limiting a radio technology, an operating enterprise, or a useful life, or ensuring quality of service on the specific spectrum.

The LAA-LTE system may use a carrier aggregation (CA) technology in the existing Long Term Evolution (LTE) system, configure a carrier in a licensed band of an operator as a basis for performing communication, configure carriers in multiple unlicensed spectrums (unlicensed carriers for short), and use the unlicensed carriers assisted by the licensed carrier to perform communication. An LTE device may use, in a CA mode, the licensed carrier as a primary component carrier (PCC) or a primary cell (PCell), and an unlicensed carrier as a secondary component carrier (SCC) or a secondary cell (SCell). In this way, the LTE device can not only inherit, by using the licensed carrier, conventional advantages of the LTE device used in wireless communication, for example, advantages in mobility, security, quality of service, and simultaneous processing of multi-user scheduling, but also achieve an objective of traffic offload by using the unlicensed carrier, thereby reducing load of the licensed carrier.

When the LAA system uses unlicensed spectrum resources, the LAA system complies with specifications defined for use of the unlicensed spectrums in various regions. A coexistence specification includes Transmit Power Control (TPC), Dynamic Frequency Selection (DFS), channel occupancy bandwidth, Listen before talk (LBT), and the like. A basic idea of LBT is as follows: before sending data on a channel, each communications device first detects whether the current channel is idle, that is, whether a neighboring node is occupying the channel for sending data can be detected. This detection process is referred to as a clear channel assessment (CCA). If it is detected in a time period that the channel is idle, the communications device may send data. Generally, time for sending data on the channel is limited. In the limited time range, the communications device does not need to perform a clear channel assessment on the channel. If it is detected that the channel is occupied, the communications device cannot transmit data on the channel currently. Detecting whether the channel is idle may be implemented in a manner of signal detection, energy detection, or the like.

In the LTE system, regardless of an eNodeB sending downlink data or LTE user equipment sending uplink data, generally, before using an unlicensed spectrum to perform data transmission, the eNodeB or the LTE user equipment first performs listening. Therefore, data transmission of the LTE device (including the base station and/or the user equipment) in the unlicensed spectrum is opportunistic. To better adapt to a service requirement of uplink/downlink data transmission, after an access network device obtains an unlicensed spectrum resource through contention, the access network device may determine downlink data transmission duration and/or uplink data transmission duration based on downlink service load and/or uplink service load or other consideration factors.

Uplink data transmission in the LTE system is generally based on scheduling. For example, when the user equipment in the LTE system transmits data on a physical uplink shared channel (PUSCH), an occupied time-frequency resource (time resource and/or frequency resource) is indicated by the access network device, for example, the base station, for example, indicated to the user equipment by using uplink grant (UL grant) control information.

From a perspective of reducing downlink control signaling overheads and/or adapting to service transmission flexibility, multi-subframe scheduling signaling may be used to schedule a terminal device to transmit uplink data in multiple uplink subframes, as shown in FIG. 1. In FIG. 1, the base station may trigger, by using one or more UL grants carried in a subframe n, one terminal device (for example, user equipment (UE)) to transmit uplink data in a subframe n+4, n+5, n+6, or n+7. It should be noted that, in embodiments of the present disclosure, if the access network device and the terminal device perform data transmission by using an unlicensed spectrum resource, before data transmission, generally, the access network device and/or the terminal device determines, by using a contention mechanism such as LBT, whether the unlicensed spectrum resource can be used to perform data transmission.

On the other hand, in the existing LTE system, the terminal device may feed back channel state information (CSI) or transmit a sounding reference signal (SRS). The access network device may determine quality of a channel between the access network device and the terminal device by detecting the CSI or the SRS, and may further configure, based on the quality of the channel, a data transmission mode between the access network device and the terminal device, for example, set an appropriate modulation and coding scheme (MCS), so as to maximally enhance data transmission efficiency while ensuring reliable data transmission. In addition, based on a hybrid automatic repeat request (HARQ) mechanism, in the existing LTE system, after the terminal device receives downlink data included in a physical downlink shared channel (PDSCH), the terminal device feeds back an acknowledgement (ACK) or a non-acknowledgement (NACK) to the access network device. After receiving the feedback information, the access network device may determine whether the downlink data corresponding to the feedback information is properly received, and therefore may properly perform a subsequent data transmission operation. Because data transmission in the unlicensed spectrum in the LTE system is opportunistic, to ensure data transmission efficiency, it is crucial to keep transmitting the CSI, the SRS, and the HARQ-ACK (including the ACK and the NACK) in the unlicensed spectrum.

Generally, the CSI, the SRS, and the HARQ-ACK may be carried in a scheduled uplink shared channel (UL-SCH) for transmission. Because uplink scheduling information may schedule at least two uplink subframes, and the at least two uplink subframes both include the UL-SCH, how the terminal device determines a position for transmitting uplink control information such as the CSI, the SRS, or the HARQ-ACK is a problem to be considered.

SUMMARY

Embodiments of the present disclosure provide a method for transmitting uplink control information, so that an opportunity for reporting uplink control information can be ensured in a multi-subframe scheduling scenario.

According to an embodiment of the present disclosure, a method for transmitting uplink control information is provided. The method includes receiving, by a terminal device, scheduling information and trigger information from an access network device. The scheduling information is used to instruct the terminal device to transmit, in M uplink subframes, uplink data scheduled by the scheduling information, M is a positive integer not less than 2, and the trigger information is used to instruct the terminal device to send uplink control information. The method further includes determining, by the terminal device, in the M uplink subframes, an uplink subframe for carrying the uplink control information, where the determined uplink subframe is a subframe other than a first subframe in the M uplink subframes, and the first subframe is a first uplink subframe in a time sequence of the M uplink subframes. The method further includes sending, by the terminal device, the uplink control information in the determined uplink subframe.

Optionally, the uplink control information includes at least one of channel state information, a sounding reference signal, and a hybrid automatic repeat request acknowledgement.

In an embodiment, the scheduling information and the trigger information are carried in same downlink control information. For example, both the scheduling information and the trigger information are carried in a UL grant.

According to another embodiment of the present disclosure, a terminal device is provided. The terminal device includes a receiving unit, configured to receive scheduling information and trigger information from an access network device. The scheduling information is used to instruct the terminal device to transmit, in M uplink subframes, uplink data scheduled by the scheduling information, M is a positive integer not less than 2, and the trigger information is used to instruct the terminal device to send uplink control information. The terminal device further includes a determining unit, configured to determine, in the M uplink subframes, an uplink subframe for carrying the uplink control information. The determined uplink subframe is a subframe other than a first subframe in the M uplink subframes, and the first subframe is a first uplink subframe in the M uplink subframes. The terminal device further includes a sending unit, configured to send the uplink control information in the determined uplink subframe.

Optionally, the uplink subframe determined by the determining unit is a last subframe in a time sequence of the M uplink subframes or a penultimate subframe in a time sequence.

Optionally, the receiving unit receives the scheduling information in a subframe n; and the determining unit is configured to determine a last or penultimate uplink subframe in a time sequence of an uplink burst included in the M uplink subframes as the uplink subframe for carrying the uplink control information, where the uplink burst refers to multiple uplink subframes that are occupied consecutively in time, and the uplink burst is after a downlink burst including the subframe n and is immediately adjacent to the downlink burst including the subframe n.

Optionally, a quantity of OFDM symbols for transmitting uplink information in the uplink subframe determined by the determining unit is not less than a specified threshold.

Optionally, the scheduling information and the trigger information are carried in same downlink control information.

Optionally, the uplink control information includes at least one of channel state information, a sounding reference signal, and a hybrid automatic repeat request acknowledgement.

This embodiment of the present disclosure may be applied to an unlicensed spectrum system. Because the uplink subframe for carrying the uplink control information is a subframe other than the first uplink subframe, before transmitting the uplink control information, the terminal device can perform CCAs before at least two uplink subframes. As long as one CCA succeeds, the terminal device can send the uplink control information in the determined uplink subframe. This can maximally ensure an opportunity for transmitting the uplink control information, and further ensure reliable and efficient data transmission in an unlicensed spectrum.

According to an embodiment of the present disclosure, a method for transmitting uplink control information is provided. The method includes receiving, by a terminal device, scheduling information and trigger information from an access network device. The scheduling information is used to instruct the terminal device to transmit, in M uplink subframes, uplink data scheduled by the scheduling information. M is a positive integer not less than 2, and the trigger information is used to instruct the terminal device to send uplink control information. The method further includes determining, by the terminal device, in the M uplink subframes, at least two uplink subframes for carrying the uplink control information; and sending, by the terminal device, the uplink control information in the at least two uplink subframes.

Optionally, the uplink control information carried in the at least two uplink subframes is the same.

Optionally, the at least two uplink subframes include a first uplink subframe and a second uplink subframe, and uplink control information carried in the first uplink subframe is different from uplink control information carried in the second uplink subframe.

According to another embodiment of the present disclosure, a terminal device is provided. The terminal device includes a receiving unit, configured to receive scheduling information and trigger information from an access network device. The scheduling information is used to instruct the terminal device to transmit, in M uplink subframes, uplink data scheduled by the scheduling information, M is a positive integer not less than 2, and the trigger information is used to instruct the terminal device to send uplink control information. The terminal device further includes a processing unit, configured to determine, in the M uplink subframes, at least two uplink subframes for carrying the uplink control information. The terminal device further includes a sending unit, configured to send the uplink control information in the at least two uplink subframes.

Optionally, the uplink control information carried in the at least two uplink subframes is the same.

Optionally, the at least two uplink subframes include a first uplink subframe and a second uplink subframe, and uplink control information carried in the first uplink subframe is different from uplink control information carried in the second uplink subframe.

This embodiment of the present disclosure may be applied to an unlicensed spectrum system. Because the at least two subframes in the M uplink subframes for transmitting the uplink data are used to carry the uplink control information, the uplink control information can be fed back as soon as possible. Because the uplink control information is carried in multiple uplink subframes separately, occupancy of excessive uplink resources for uplink data transmission in a scheduled uplink subframe can be avoided.

To improve resource utilization, the present disclosure provides an embodiment of a method for transmitting uplink control information.

According to an embodiment of the present disclosure, a method for transmitting uplink control information is provided. The method includes receiving, by a terminal device, scheduling information and trigger information from an access network device. The scheduling information is used to instruct the terminal device to transmit, in M uplink subframes, uplink data scheduled by the scheduling information, the uplink data includes first uplink data and second uplink data. M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The method includes determining, by the terminal device, a first MCS or a first RB corresponding to the first uplink subframe set, and determining a second MCS or a second RB corresponding to the second uplink subframe set. The method includes transmitting, by the terminal device, in the first uplink subframe set, the first uplink data corresponding to the first MCS or the first RB, and transmitting, in the second uplink subframe set, the second uplink data and the uplink control information corresponding to the second MCS or the second RB.

According to another embodiment of the present disclosure, a terminal device is provided. The terminal device includes a receiving unit, configured to receive scheduling information and trigger information from an access network device. The scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The terminal device includes a determining unit, configured to determine a first MCS or a first RB corresponding to the first uplink subframe set, and determine a second MCS or a second RB corresponding to the second uplink subframe set. The terminal device includes a sending unit, configured to transmit, in the first uplink subframe set, the first uplink data corresponding to the first MCS or the first RB, and transmit, in the second uplink subframe set, the second uplink data and the uplink control information corresponding to the second MCS or the second RB.

Correspondingly, according to another embodiment of the present disclosure, a method for transmitting uplink control information is provided. The method includes sending, by an access network device, scheduling information and trigger information to a terminal device, where the scheduling information is used to instruct the terminal device to transmit scheduled uplink data in M uplink subframes. The uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The method includes determining, by the access network device, a first MCS or a first RB corresponding to the first uplink subframe set, and determining a second MCS or a second RB corresponding to the second uplink subframe set. The method includes receiving, by the access network device, in the first uplink subframe set, the first uplink data corresponding to the first MCS or the first RB, and receiving, in the second uplink subframe set, the uplink control information and the second uplink data corresponding to the second MCS or the second RB.

According to another embodiment of the present disclosure, an access network device is provided. The access network device includes a sending unit, configured to send scheduling information and trigger information to a terminal device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set. The first uplink subframe set and the second uplink subframe set respectively include at least one uplink subframe. The subframe in the first uplink subframe set is used to transmit the first uplink data, and the subframe in the second uplink subframe set is used to transmit the uplink control information and the second uplink data. The terminal device includes a processing unit, configured to determine a first MCS or a first RB corresponding to the first uplink subframe set, and determine a second MCS or a second RB corresponding to the second uplink subframe set. The terminal device includes a receiving unit, configured to receive, in the first uplink subframe set, the first uplink data corresponding to the first MCS or the first RB, and receive, in the second uplink subframe set, the second uplink data and the uplink control information corresponding to the second MCS or the second RB.

In this embodiment, in a multi-subframe scheduling case, different MCSs or RBs can be determined according to actual sizes of resources respectively used to transmit uplink data in different uplink subframes. Therefore, efficiency of using uplink resources in uplink subframes carrying only uplink data can be ensured while signaling overheads in multi-subframe scheduling are reduced.

DETAILED DESCRIPTION OF ILLUSTRATIVE EMBODIMENTS

Figure 1:
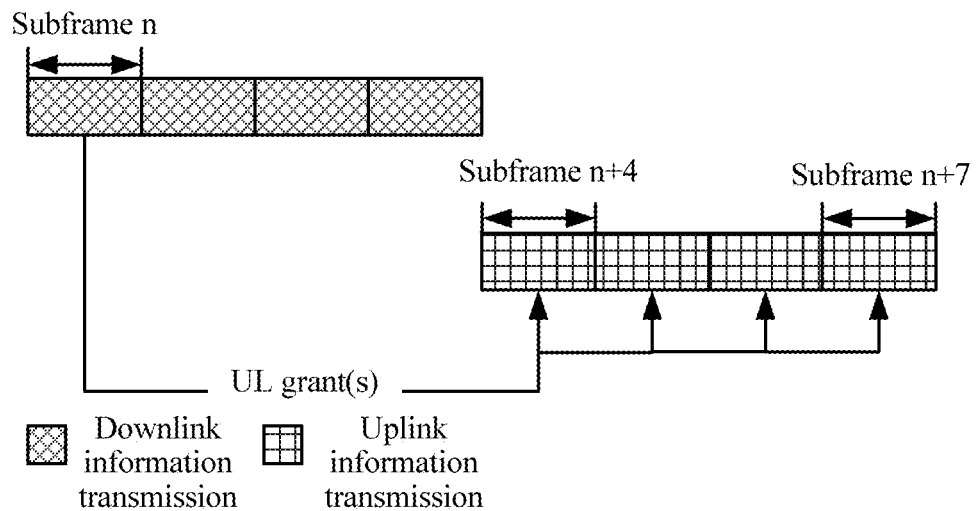
FIG. 1 is a schematic diagram of multi-subframe scheduling.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Although the background is described by using an LTE system as an example, a person skilled in the art should understand that, the present disclosure is not only applicable to the LTE system, but also applicable to other wireless communications systems, for example, a Global System for Mobile Communications (GSM), a Mobile Telecommunications System (UMTS), a Code Division Multiple Access (CDMA) system, and a new network system. The following describes the embodiments in detail by using an LTE system as an example.

A licensed-assisted access using LTE system is an LTE system in which a licensed band and an unlicensed spectrum are used together in a CA or non-CA (for example, DC) mode.

A mainstream deployment scenario of the licensed-assisted access using LTE system is a scenario in which a licensed band and an unlicensed spectrum are jointly used through carrier aggregation CA. To be specific, the licensed band or a carrier included in the licensed band or a cell working in the licensed band is used as a primary cell, and the unlicensed spectrum or a carrier included in the unlicensed spectrum or a cell working in the unlicensed spectrum is used as a secondary cell. The primary cell and the secondary cell may be deployed on a same site, or may not be deployed on a same site, and an ideal backhaul path exists between the two cells.

However, the present disclosure is not limited to the foregoing CA scenario. There are also other deployment scenarios, including a scenario in which no ideal backhaul path exists between the two cells (primary cell and secondary cell). Because a backhaul delay is relatively long, information cannot be quickly coordinated between the two cells, for example, in a DC scenario.

In addition, independent deployment of the cell working in the unlicensed spectrum may be considered. In this case, the cell working in the unlicensed spectrum can directly provide an independent access function, and does not require assistance from the cell working in the licensed band, for example, in a standalone LTE over unlicensed spectrum (Standalone U-LTE) system.

In the present disclosure, regardless of the licensed band or the unlicensed spectrum, one or more carriers may be included. Carrier aggregation is performed on the licensed band and the unlicensed spectrum. This may include carrier aggregation performed on one or more carriers included in the licensed band and one or more carriers included in the unlicensed spectrum.

The cell mentioned in the present disclosure may be a cell corresponding to a base station. For example, the cell may belong to a macro base station, or may belong to a base station corresponding to a small cell. Small cells herein may include a metro cell, a micro cell, a pico cell, a femto cell, and the like. The small cells have features of small coverage and low transmit power, and are used to provide high-speed data transmission services.

In the LTE system, multiple intra-frequency cells may simultaneously work in a carrier. In some special scenarios, it may also be considered that concepts of the carrier and the cell are equivalent in the LTE system. For example, in a CA scenario, when a secondary carrier is configured for UE, a carrier index of the secondary carrier and a cell identity (Cell ID) of a secondary cell working on the secondary carrier are both carried. In this case, it may be considered that the concepts of the carrier and the cell are equivalent. For example, for the UE, accessing a carrier is equivalent to accessing a cell. DC and standalone U-LTE may also be based on this understanding. In the present disclosure, the concept of the cell is used for description.

Network elements in the embodiments of the present disclosure include an access network device and a terminal device that may work in the unlicensed spectrum.

Each embodiment of the present disclosure is described with reference to the terminal device. The terminal device may also be referred to as user equipment (UE), a mobile station, an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a Wireless Local Area Network (WLAN), or may be a cellular phone, a cordless telephone, a Session Initiation Protocol (SIP) phone, a Wireless Local Loop (WLL) station, a Personal Digital Assistant (PDA), a handheld device or computing device that has a wireless communication function, or another processing device, in-vehicle device, or wearable device that is connected to a wireless modem, a mobile station in a future 5G network, a terminal device in a future evolved PLMN network, or the like.

In addition, in the embodiments of the present disclosure, the terminal device may further include a relay, another device capable of performing data communication with the access network device (for example, a base station), or the like.

Each embodiment of the present disclosure is described with reference to the access network device. The access network device may be a device configured to communicate with a mobile station. The access network device may be an access point (AP) in a WLAN, a Base Transceiver Station (BTS) in GSM or Code Division Multiple Access (CDMA), or an NodeB (NB) in WCDMA, or may be an eNB or Evolved NodeB (eNodeB) in Long Term Evolution (LTE), a relay station or an access point, an in-vehicle device, a wearable device, an access network device in a future 5G network, an access network device in a future evolved PLMN network, or the like.

Uplink control information in the embodiments of the present disclosure is control information fed back by the terminal device to the access network device. The uplink control information may include channel state information CSI, a sounding reference signal SRS, or a hybrid automatic repeat request acknowledgement (HARQ-ACK). The HARQ-ACK includes an acknowledgement (ACK) or a negative acknowledgement (NACK), or may further include discontinuous transmission (DTX). The channel state information CSI may be preferably aperiodic CSI, but certainly also does not exclude periodic CSI. Specifically, the CSI may further include at least one of a channel quality indicator (CQI), a precoding matrix indicator (PMI), and a rank indicator (RI). The CSI may be used to reflect quality of a channel between the access network device and the terminal device. The access network device may also determine quality of the channel between the access network device and the terminal device by detecting a received SRS. After determining the quality of the channel, the access network device may set an appropriate transmission mode based on the quality of the channel, so as to improve data transmission efficiency while ensuring reliable data transmission with the terminal device. The access network device may determine, by receiving a HARQ-ACK fed back by the terminal device, whether downlink data scheduled to the terminal device is properly received by the terminal device; and if determining that the scheduled data is properly received, the access network device may transmit new data; or if determining that the scheduled data is not properly received, the access network device may retransmit the data. This can ensure reliable transmission of the scheduled downlink data.

It should be noted that, in the embodiments of the present disclosure, duration of a subframe is one millisecond (1 ms). Given a normal cyclic prefix, a subframe includes 14 orthogonal frequency division multiplexing (OFDM) symbols. Given an extended cyclic prefix, a subframe includes 12 OFDM symbols. Certainly, this also does not exclude using a shorter subframe in a future further evolved LTE system or another wireless system. For example, duration of a future subframe is equivalent to duration of a current OFDM symbol. For example, for an LTE system supporting a short transmission time interval (S-TTI), it may be understood that a subframe may be denoted by a timeslot (e.g., Slot), or may be denoted by one or more (for example, a positive integer less than 7 or a positive integer less than 6) OFDM symbols. A subframe may be understood as a scheduled basic time unit. In the embodiments of the present disclosure, meanings of a subframe whose duration is N OFDM symbols and a transmission time interval (TI) whose duration is N OFDM symbols may be consistent. Given a normal cyclic prefix, N may be not greater than 14. Given an extended cyclic prefix, N may be not greater than 12.

In the embodiments of the present disclosure, duration used for information transmission in a subframe may be equal to duration of a subframe, or may be less than duration of a subframe. For example, if duration of a downlink subframe is 1 ms, duration used for downlink information transmission in the subframe may be equal to 1 ms, or may be less than 1 ms. For another example, if duration of an uplink subframe is 1 ms, duration used for uplink information transmission in the subframe may be equal to 1 ms, or may be less than 1 ms. Optionally, if duration of a subframe is 1 ms, when duration used for downlink information transmission in the subframe is less than 1 ms, the subframe may further include uplink information. In addition, the subframe further includes switching time used for uplink/downlink switching. For example, for the access network device, the uplink/downlink switching time may be understood as the time for switching between downlink sending and uplink receiving; and for the terminal device, the uplink/downlink switching time may be understood as the time for switching between downlink receiving and uplink sending.

In the embodiments of the present disclosure, the duration of the downlink subframe may be the same or different from the duration of the uplink subframe.

In the embodiments of the present disclosure, uplink information corresponds to information sent by the terminal device to the access network device. The uplink information includes uplink data, an uplink reference signal, uplink control information, and information carried in a physical random access channel (PRACH). The uplink data may correspond to data carried in a UL-SCH (or may be understood as uplink service data), and the uplink reference signal includes an uplink demodulation reference signal (DMRS). The uplink control information includes at least one of the following: channel state information (CSI), a scheduling request (SR), a HARQ-ACK, and a sounding reference signal (SRS). In the embodiments of the present disclosure, the SRS may be understood as a type of uplink control information. The uplink control information may be carried in a physical uplink control channel (PUCCH), or may be carried in a physical uplink shared channel (PUSCH).

In the embodiments of the present disclosure, downlink information corresponds to information sent by the access network device such as an eNodeB to the terminal device. The downlink information may include data carried in a downlink physical channel, and/or a downlink reference signal. The downlink physical channel includes at least one of the following: physical downlink shared channel (PDSCH), a physical broadcast channel (PBCH), a physical multicast channel (PMCH), a physical control format indicator channel (PCFICH), a physical downlink control channel (PDCCH), a physical hybrid automatic repeat request indicator channel (PHICH), an enhanced physical downlink control channel (EPDCCH), and an MTC physical downlink control channel (MPDCCH). The downlink reference signal includes at least one of the following: a cell-specific reference signal (CRS) a multimedia broadcast multicast service single frequency network reference signal (MBSFN RS), a user equipment specific reference signal (UE-specific Reference Signal, DMRS) for demodulating data carried in the PDSCH, a reference signal (DeModulation Reference Signal, DMRS) for demodulating data carried in the EPDCCH or the MPDCCH, a positioning reference signal (PRS), and a channel state information reference signal (CSI Reference Signal, CSI-RS).

Uplink data transmission in the LTE system is generally based on scheduling. Using the terminal device in the LTE system as an example, when data is transmitted in a physical uplink shared channel (PUSCH), occupied time-frequency resources (time resources and/or frequency resources) are indicated by the access network device such as a base station. For example, the base station indicates, to the terminal device by using uplink grant (UL grant) control information, time-frequency resources occupied when the terminal device transmits uplink data. In a multi-subframe scheduling scenario, the access network device may schedule, by using multi-subframe scheduling signaling, the terminal device to transmit uplink data in multiple uplink subframes. For example, the base station may schedule, in a subframe n by using one or more UL grants, the terminal device to transmit uplink data in the PUSCH included in multiple subframes. As shown in FIG. 1, the base station may trigger, by using one or more UL grants carried in the subframe n, one terminal device (for example, UE) to transmit uplink data in a subframe n+4, n+5, n+6, or n+7. The base station may instruct, by using trigger information included in uplink scheduling signaling (for example, the UL grant), the user equipment to feed back uplink control information. In the multi-subframe scheduling case, because the scheduling signaling may schedule at least two uplink subframes, when the terminal device transmits uplink control information in a subframe for transmitting uplink data, how to determine the subframe for transmitting the uplink control information in the at least two uplink subframes is a problem urgently to be solved.

For example, the uplink control information is aperiodic CSI. In the prior art, a preconfigured time relationship exists between a subframe carrying aperiodic CSI and a subframe carrying trigger information for triggering aperiodic CSIing. For example, in a frequency division duplex (FDD) system, assuming UE receives aperiodic CSI trigger indication information in a subframe n, where the aperiodic CSI trigger indication information may be carried in a physical downlink control channel (PDCCH) or an enhanced physical downlink control channel (EPDCCH), and the aperiodic CSI trigger indication information may be understood as information included in a CSI request field carried in the PDCCH or the EPDCCH, the UE reports aperiodic CSI in a subframe n+4, and the aperiodic CSI is carried in an uplink resource indicated by a UL grant. For another example, in a time division duplex (TDD) system, still assuming that UE receives uplink scheduling indication information (carried in a UL grant) in a subframe n, where the indication information includes aperiodic CSI trigger information, the UE reports aperiodic CSI in a subframe n+k, where k is a positive integer, and a value of k is related to an uplink-to-downlink configuration of the TDD system and a value of n. Details are shown in the following Table 1. In Table 1, using a TDD configuration 0 as an example, if the UE receives aperiodic CSI trigger information in a subframe 0, the UE reports aperiodic CSI in a subframe 4.

TABLE 1

Values of k corresponding to TDD configurations 0 to 6

| TDD UL/DL configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Based on the foregoing description, it can be observed that, in the prior art, the uplink subframe for reporting the CSI is in a position of a preconfigured uplink subframe, and the preconfigured uplink subframe is an uplink subframe nearest to the subframe n, among the subframe n+4 and subframes after the subframe n+4.

In a multi-subframe scheduling technology, if the access network device and the terminal device perform data transmission by using an unlicensed spectrum resource, before data transmission, generally, the access network device and/or terminal device determines, by using a contention mechanism such as a CCA, whether the unlicensed spectrum resource can be used to perform data transmission. According to the prior art, if the UL grant carried in the subframe n includes aperiodic CSI trigger indication information, the UE transmits, in the subframe n+4, aperiodic CSI by using a PUSCH resource. If the UE fails to obtain an unlicensed spectrum resource through contention in the subframe n+4, according to the prior art, even if scheduled uplink resources still exist in subsequent subframes (for example, the subframe n+5, n+6, or n+7), the UE cannot transmit aperiodic CSI, and therefore, efficiency of downlink data transmission is affected.

The foregoing problem also exists in SRS transmission and HARQ-ACK transmission. Details are not further described herein.

Embodiment 1

To ensure an opportunity for reporting uplink control information and improve efficiency of transmitting downlink data in an unlicensed spectrum, the present disclosure provides an embodiment of a method for transmitting uplink control information. This embodiment may be applied to a multi-subframe scheduling scenario in a U-LTE (LTE over unlicensed spectrum) system. It should be noted that, the U-LTE system is an LTE system working in the unlicensed spectrum, and may include an LTE system (LAA-LTE system) that uses a licensed band resource and an unlicensed spectrum resource jointly in a CA mode, or may include an LTE system that uses a licensed band resource and an unlicensed spectrum resource jointly in a dual connectivity (DC) mode, or may include an LTE system (standalone U-LTE) that is independently deployed in an unlicensed spectrum resource.

Figure 2:
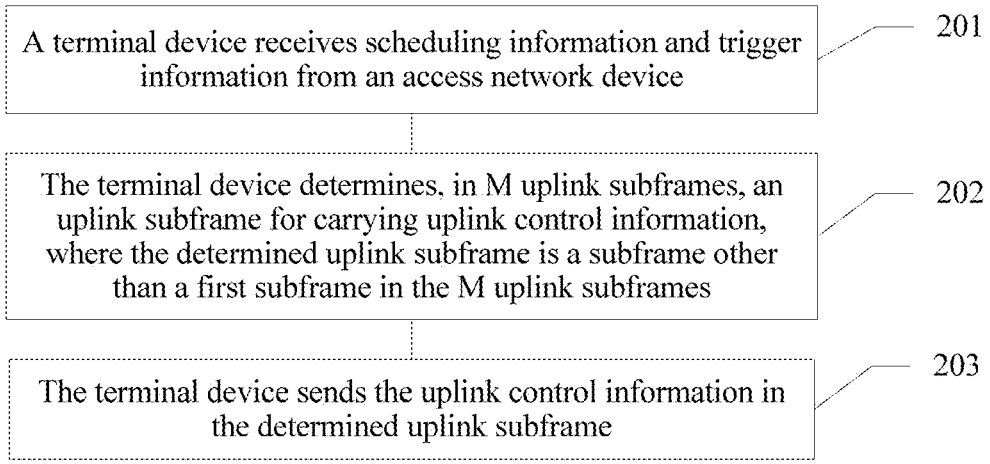
FIG. 2 is a schematic flowchart of a method for transmitting uplink control information according to an embodiment of the present disclosure.

Referring to FIG. 2, the present disclosure provides an embodiment of a method for transmitting uplink control information. The method may be applied to an LTE system working in an unlicensed spectrum. The method includes the following steps.

S201. A terminal device receives scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information.

S202. The terminal device determines, in the M uplink subframes, an uplink subframe for carrying the uplink control information, where the determined uplink subframe is a subframe other than a first subframe in the M uplink subframes, and the first subframe is a first uplink subframe in a time sequence of the M uplink subframes.

S203. The terminal device sends the uplink control information in the determined uplink subframe.

It should be noted that, in this embodiment of the present disclosure, if data transmitted between the access network device and the terminal device is carried in an unlicensed spectrum, before the access network device transmits downlink information by using the unlicensed spectrum, or before the terminal device transmits uplink information by using the unlicensed spectrum, generally, a clear channel assessment (CCA) is performed to determine whether an unlicensed spectrum resource is available. The accompanying drawings in this embodiment of the present disclosure are intended only for describing execution of the CCA, instead of limiting a specific position of the CCA. In addition, some of the accompanying drawings in this embodiment of the present disclosure are intended only for describing an uplink subframe position that is used to carry the uplink control information and determined by using this embodiment of the present disclosure; therefore, the position of the CCA is ignored. However, actually, the CCA may be performed or does not need to be performed.

In this embodiment of the present disclosure, "the scheduling information is used to instruct the terminal device to transmit, in M uplink subframes, uplink data scheduled by the scheduling information" may be understood as "the scheduling information is used to instruct the terminal device to transmit the uplink data in the M uplink subframes, where the uplink data is scheduled by the scheduling information"; or may be understood as "the scheduling information is used to instruct the terminal device to transmit the uplink data scheduled by the scheduling information, where the scheduling information may be used to specifically indicate in how many uplink subframes and/or in which uplink subframes transmission is performed, or other manners may be used".

In this embodiment of the present disclosure, the scheduling information may be used to indicate at least one of the following: a transmission format corresponding to the scheduled uplink data, for example, whether frequency hopping is required in a frequency position when the scheduled uplink data is transmitted in a corresponding time-frequency resource, resource allocation corresponding to the scheduled uplink data, power control information corresponding to the scheduled uplink data, new transmission or retransmission information corresponding to the scheduled uplink data, or an MCS corresponding to the scheduled uplink data, where a quantity of uplink subframes corresponding to the scheduled uplink data may correspond to M in this embodiment of the present disclosure.

In this embodiment of the present disclosure, the scheduling information may be one or some information fields included in downlink control information (DCI), or may be all information fields included in DCI. The scheduling information may be carried in a physical downlink control channel (PDCCH) and/or an enhanced physical downlink control channel (EPDCCH), or may be carried in another channel. This is not specifically limited in the present disclosure.

In this embodiment of the present disclosure, the scheduling information may be UE-specific indication information, for example, effective only on a terminal device or a terminal device group. The scheduling information may also be cell-specific indication information, for example, effective on all terminal devices in a connected mode in a cell or all terminal devices using the cell as a serving cell (including terminal devices in the connected mode and an idle mode).

Optionally, in this embodiment of the present disclosure, the scheduling information may be an information field included in uplink grant (UL grant) control information. For example, the scheduling information may include at least one of the following: a carrier indicator, a frequency hopping flag, resource block assignment and hopping resource allocation, a modulation and coding scheme (MCS), a redundancy version (RV) indicator, a cyclic shift (CS) and an orthogonal cover code (OCC) corresponding to an uplink demodulation reference signal (DMRS), and a new data indicator (NDI). Further optionally, the scheduling information includes an information field included in control information that is transmitted in a DCI format 0 or a DCI format 4, or may further include an information field included in control information transmitted in an enhanced DCI format based on the DCI format 0 (referred to as a DCI format 0 enhanced format for ease of description) or an enhanced DCI format based on the DCI format 4 (likewise, referred to as a DCI format 4 enhanced format for ease of description).

It should be noted that, according to the prior art, generally, using a frequency division duplex (FDD) system as an example, the DCI format 0 is used to instruct the terminal device to transmit, in an uplink subframe, uplink data scheduled by the DCI format 0, where the uplink data corresponds to one transport block (TB) or corresponds to one codeword; and the DCI format 4 is used to instruct the terminal device to transmit, in an uplink subframe, uplink data information scheduled by the DCI format 4, where the uplink data corresponds to two transport blocks TBs or corresponds to two codewords. Herein the DCI format 0 enhanced format may be understood as "necessary information fields are added based on the DCI format 0, so as to support scheduling of multiple uplink UL subframes simultaneously by using one piece of scheduling information". The DCI format 4 enhanced format may be understood as "necessary information fields are added based on the DCI format 4, so as to support scheduling of multiple uplink subframes simultaneously by using one piece of scheduling information, where each uplink subframe may support transmission of two transport blocks.

In this embodiment, the determined uplink subframe includes up to one subframe. Determining up to one uplink subframe for carrying the uplink control information may reduce resource overheads of the uplink control information.

In an embodiment, the scheduling information and the trigger information are carried in same downlink control information. For example, both the scheduling information and the trigger information are carried in a UL grant.

In this embodiment of the present disclosure, the scheduling information and the trigger information are carried in same downlink control information (DCI). For example, the scheduling information and the trigger information are carried in one UL grant, the UL grant is used to instruct the terminal device to transmit the uplink data and the uplink control information, and the trigger information may be an aperiodic CSI request included in the UL grant. It should be noted that, when the uplink control information is an SRS, the trigger information may be an SRS request included in the UL grant. It should be noted that, when the uplink control information is a HARQ-ACK, the trigger information may be understood as downlink data corresponding to the HARQ-ACK or PDSCH transmission corresponding to the HARQ-ACK. For example, assuming that the terminal device receives, in a subframe n, downlink data (downlink service data carried in the PDSCH) sent by the access network device, or detects, in a subframe n, PDSCH transmission sent by the access network device, the terminal device may send, in a subframe n+4 according to a preconfigured HARQ timing relationship, a HARQ-ACK corresponding to the downlink data. In this embodiment of the present disclosure, the downlink data received in the subframe n or the PDSCH transmission detected in the subframe n may be understood as "the trigger information used to instruct the terminal device to send the uplink control information (HARQ-ACK)". It should be noted that, when the uplink control information is the HARQ-ACK, the trigger information may be further understood as a downlink control channel corresponding to the HARQ-ACK, where the downlink control channel is defined as follows. The terminal device may receive, by detecting the downlink control channel, downlink data in a downlink data channel scheduled by the detected downlink control information. This embodiment of the present disclosure also does not exclude that the trigger information corresponding to the HARQ-ACK is indication information in another form, and does not exclude that the HARQ timing relationship is indicated by signaling.

In an embodiment, the scheduling information and the trigger information are carried in a same downlink subframe. In this embodiment of the present disclosure, the scheduling information and the trigger information used to instruct the terminal device to send the uplink control information are carried in a same subframe; or optionally, a subframe including the trigger information precedes a subframe including the scheduling information in a time sequence, and certainly, this also does not exclude that the subframe including the trigger information follows the subframe including the scheduling information and precedes the first uplink subframe in the M uplink subframes in a time sequence.

In an embodiment, the uplink control information includes at least one of channel state information, a sounding reference signal, and a hybrid automatic repeat request acknowledgement.

Figure 3:
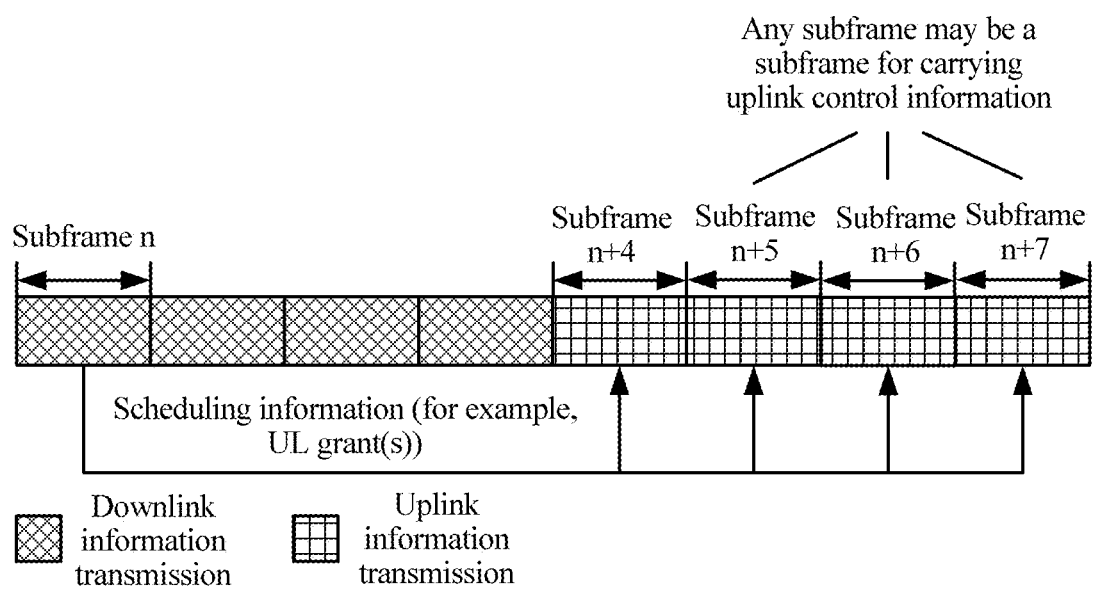
FIG. 3 is a schematic diagram of a relationship between subframes in multi-subframe scheduling.

Referring to a schematic diagram of a relationship between subframes in multi-subframe scheduling in FIG. 3, the scheduling information such as the UL grant is sent in the downlink subframe n. The subframe n+4, a subframe n+5, a subframe n+6, and a subframe n+7 are uplink subframes scheduled by the downlink subframe n (that is, M=4). Using CSI as an example, the terminal device receives the trigger information in the subframe n, and the trigger information instructs the terminal device to send the uplink control information, for example, aperiodic channel state information (CSI). In this case, the terminal device may determine to send the CSI in an uplink subframe in the subframe n+4, the subframe n+5, the subframe n+6, and the subframe n+7. In this embodiment of the present disclosure, the uplink subframe determined by the terminal device for transmitting the CSI may be a subframe other than the first uplink subframe in the subframe n+4 to the subframe n+7. That is, any one of the subframe n+5, the subframe n+6, and the subframe n+7 in FIG. 3 may be used as the uplink subframe for carrying the uplink control information.

In this embodiment, in the M uplink subframes for transmitting the uplink data, a subframe other than the first subframe is used to carry the uplink control information. Before transmitting the uplink control information, the terminal device can perform CCAs before at least two uplink subframes; or the terminal device can perform a CCA before at least one uplink subframe in multiple uplink subframes including an uplink shared channel (UL-SCH). As long as one CCA succeeds, the terminal device can send the uplink control information in the determined uplink subframe. This can maximally ensure an opportunity for transmitting the uplink control information, and further ensure reliable and efficient data transmission in the unlicensed spectrum. For example, as shown in FIG. 3, if the terminal device determines the subframe n+7 as the uplink subframe for carrying the uplink control information, the terminal device may perform a CCA before at least one of multiple uplink subframes before determining that an unlicensed spectrum resource is obtained through contention. For example, even if the terminal device fails to obtain an unlicensed spectrum resource through contention in the subframe n+4, the subframe n+5, and the subframe n+6, the terminal device may still perform a CCA before the subframe n+7, and determine whether the uplink control information can be transmitted in the subframe n+7. Therefore, by adding an opportunity for the terminal device to contend for an unlicensed spectrum resource before the terminal device transmits the uplink control information, transmission of the uplink control information can be ensured maximally.

Optionally, the terminal device performs a CCA before at least one of multiple uplink subframes before sending the uplink control information in the determined uplink subframe, and the multiple uplink subframes are at least two uplink subframes included in the M uplink subframes. For example, in the foregoing example, if the terminal device determines that the subframe n+7 is the subframe for carrying the uplink control information, the terminal device may perform a CCA before at least one of the subframe n+4, the subframe n+5, and the subframe n+6.

In this embodiment, the terminal device may determine, in the M uplink subframes in multiple manners, the uplink subframe for carrying the uplink control information.

Implementation 1: The terminal device determines a last subframe in the time sequence of the M uplink subframes or a penultimate subframe in the time sequence as the uplink subframe for carrying the uplink control information.

Using FIG. 3 as an example, it is assumed that the terminal device receives, in the subframe n, a UL grant sent by the access network device, where the UL grant instructs the terminal device to transmit the uplink data in the subframe n+4, the subframe n+5, the subframe n+6, and the subframe n+7, and the uplink data is carried in a PUSCH. Further, the UL grant includes an aperiodic CSI request, and the CSI request instructs the terminal device to transmit aperiodic CSI. In the implementation 1, if the terminal device can determine, by performing a CCA, that an unlicensed spectrum resource is obtained through contention in the subframe n+6 or the subframe n+7, the terminal device can transmit the aperiodic CSI in the subframe n+7, or transmit the aperiodic CSI in the subframe n+6.

A benefit of transmitting the uplink control information in the last subframe in the time sequence is that an opportunity for transmitting the uplink control information can be ensured maximally. Even if the terminal device fails to obtain an unlicensed spectrum resource through contention in the first scheduled uplink subframe, the terminal device may continue to assess whether any unlicensed spectrum resource is available before transmitting data in subsequent uplink subframes. In this case, according to this solution, a subframe for carrying the aperiodic CSI is configured or indicated in a relatively rear position in multiple scheduled uplink subframes if possible. This is equivalent to providing more CCA opportunities for subframes for carrying the aperiodic CSI. Therefore, transmission of the aperiodic CSI is ensured maximally.

Figure 4:
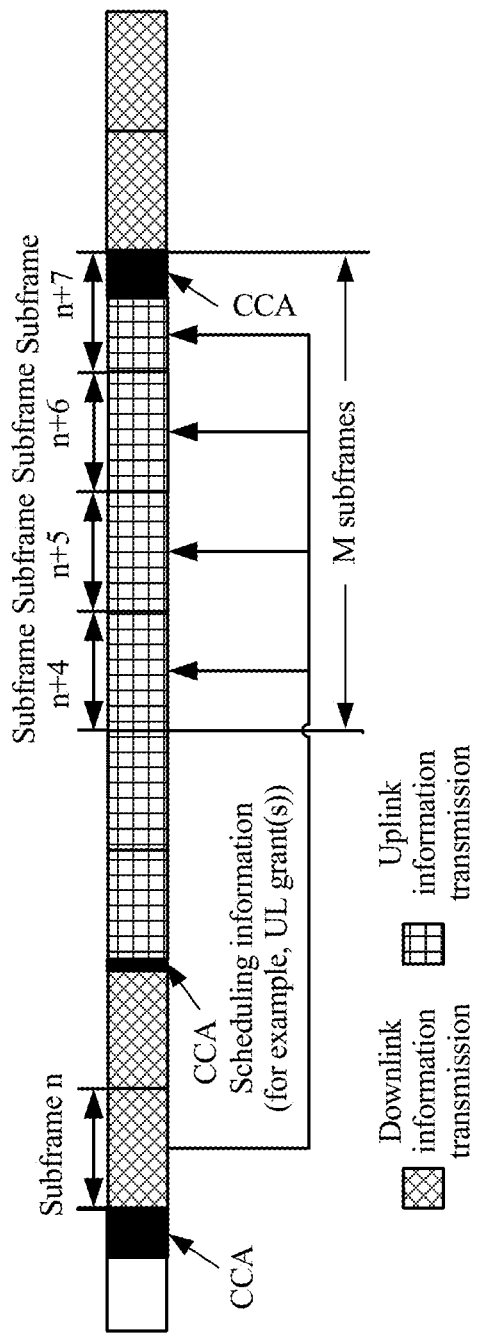
FIG. 4 is a schematic diagram of another relationship between subframes in multi-subframe scheduling.

A benefit of transmitting the uplink control information in the penultimate subframe in the time sequence is that lossless transmission of the uplink control information in some cases can be ensured. Considering the following case, the M uplink subframes may be followed by a downlink subframe, as shown in FIG. 4. Generally, the access network device first performs a CCA before performing downlink information transmission. To ensure that the downlink information transmission can start from a first OFDM symbol included in a downlink subframe, some time of the last uplink subframe before the downlink subframe cannot be used for uplink information transmission, so that the access network device can perform a CCA within the time, thereby ensuring that the downlink information transmission can start from the first OFDM symbol in the downlink subframe. In this case, because some time of the last uplink subframe cannot be used for uplink information transmission, if the aperiodic CSI is still carried in the last subframe in the M uplink subframes, aperiodic CSI transmission performance is affected. Therefore, based on this case, the aperiodic CSI may be carried in the penultimate subframe in the M uplink subframes, for example, the subframe n+6 shown in FIG. 4.

It should be noted that, in this embodiment of the present disclosure, that the scheduling information is used to instruct the terminal device to transmit, in M uplink subframes, uplink data scheduled by the scheduling information may include that the scheduling information is used to instruct the terminal device to transmit the uplink information within duration used for uplink information transmission in the M uplink subframes.

Implementation 2: The terminal device receives the scheduling information in the subframe n; and the terminal device determines a last or penultimate uplink subframe in a time sequence of an uplink burst as the uplink subframe for carrying the uplink control information. The uplink burst refers to multiple uplink subframes that are occupied consecutively in time and included in the M uplink subframes, and the uplink burst is after a downlink burst including the subframe n and is immediately adjacent to the downlink burst including the subframe n.

More generally, in this embodiment of the present disclosure, the terminal device determines any uplink subframe in the uplink burst as the uplink subframe for carrying the uplink control information, where the any uplink subframe is not the first uplink subframe in the M uplink subframes.

Alternatively, the implementation 2 may be understood as "the terminal device receives the scheduling information in the subframe n; and the terminal device determines a last or penultimate uplink subframe in a time sequence of a first uplink burst as the uplink subframe for carrying the uplink control information". An uplink subframe set composed of the M uplink subframes includes the first uplink burst and a second uplink burst. The first uplink burst is after the downlink burst including the subframe n and is immediately adjacent to the downlink burst including the subframe n.

More generally, in this embodiment of the present disclosure, the terminal device determines any uplink subframe in the time sequence of the first uplink burst as the uplink subframe for carrying the uplink control information, where the any uplink subframe does not include the first uplink subframe in the M uplink subframes.

Figure 5:
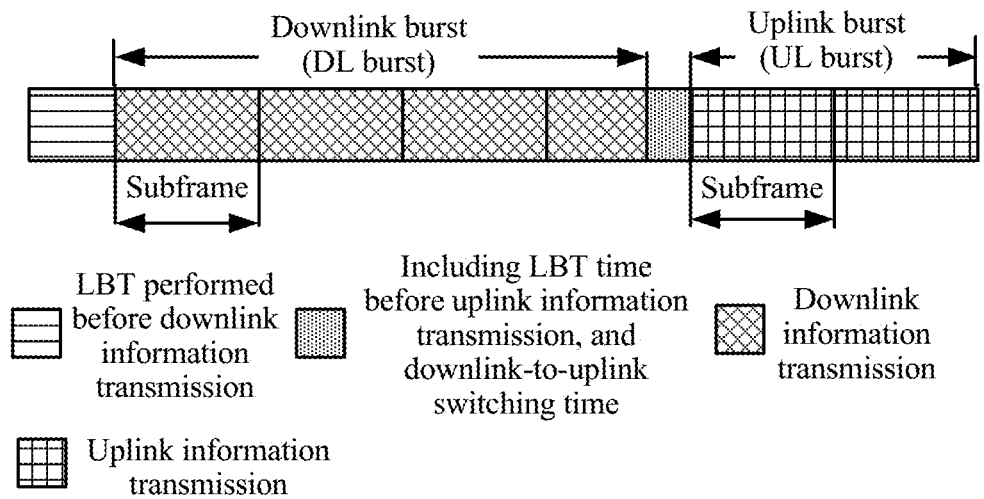
FIG. 5 is a schematic diagram of another relationship between subframes in multi-subframe scheduling.
Figure 6:
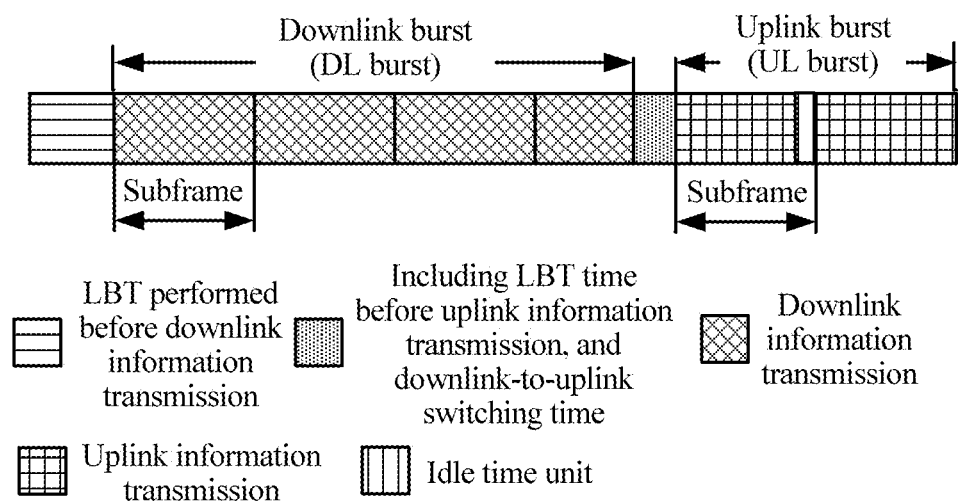
FIG. 6 is a schematic diagram of another relationship between subframes in multi-subframe scheduling.

In this embodiment of the present disclosure, the uplink burst (UL burst) includes multiple uplink subframes that are occupied consecutively in time. In this embodiment of the present disclosure, the multiple uplink subframes may include a time area (for example, as shown in FIG. 5) used for a CCA, or may not include a time area (for example, as shown in FIG. 6) used for a CCA. In FIG. 6, an idle time unit may be at least used for performing a CCA by another terminal device.

In this embodiment of the present disclosure, the downlink burst refers to multiple downlink subframes that are occupied consecutively in time. Specifically, after a base station (such as an eNB) or a cell within coverage of a base station preempts an unlicensed spectrum resource, the base station or the cell performs data transmission by using the unlicensed spectrum resource without using a contention mechanism such as a CCA. Duration of a downlink burst is not longer than maximum time of consecutive transmission by the base station (or the cell) on the unlicensed spectrum resource without using the contention mechanism, and the maximum time may also be referred to as maximum channel occupancy time (MCOT). The MCOT may be related to constraints of regional laws and regulations. For example, in Japan, the MCOT may be equal to 4 ms; in Europe, the MCOT may be equal to 8 ms, 10 ms, or 13 ms. The MCOT may also be related to a contention mechanism used by a listening device (for example, the base station or user equipment). Generally, if listening time is shorter, the MCOT is shorter. The MCOT may also be related to a service level of data transmission. For example, using a VoIP service as an example, a priority of the service is relatively high, and in this case, generally, the MCOT may be 2 ms, or may be 2 milliseconds consecutively after the base station obtains an unlicensed spectrum resource through contention. Using a data transmission service as an example, a priority of the service is relatively low, and generally, the MCOT may be 8 or 10 milliseconds consecutively.

Figure 7:
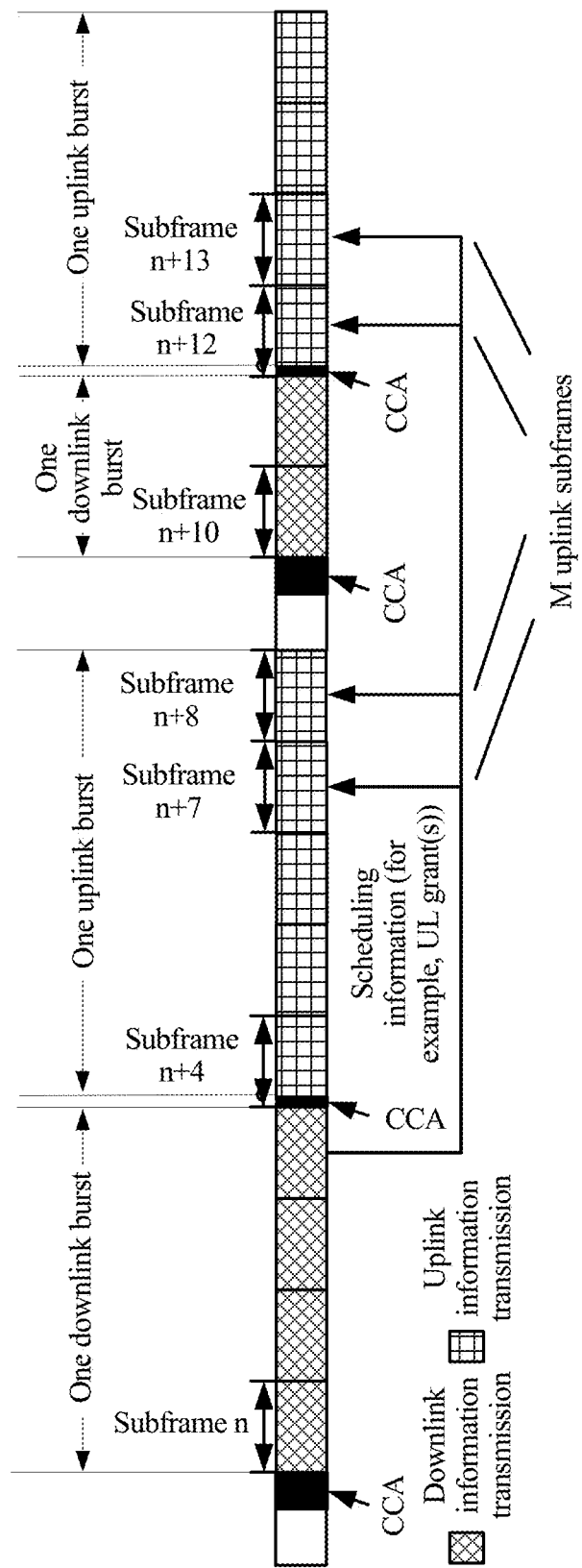
FIG. 7 is a schematic diagram of another relationship between subframes in multi-subframe scheduling.

Using FIG. 7 as an example, the terminal device receives, in a subframe n+3, the scheduling information sent by the access network device, and the scheduling information instructs the terminal device to transmit the uplink data in the subframe n+7, a subframe n+8, a subframe n+12, and a subframe n+13. An uplink burst including the subframe n+7 and the subframe n+8 is an uplink burst immediately adjacent to a downlink burst including the subframe n+3. An uplink burst including the subframe n+12 and the subframe n+13 is not an uplink burst immediately adjacent to the downlink burst including the subframe n+3. In the implementation 2, the uplink subframe for carrying the uplink control information may be the subframe n+8.

It should be noted that, in this embodiment of the present disclosure, a subframe n+x may be used to represent a subframe that has a specific relative relationship with the subframe n. To be specific, the subframe n+x represents a subframe corresponding to the subframe n after a delay of x subframes. A specific subframe index corresponding to the subframe n+x may be obtained by performing a modulo operation on 10 by using n+x. For example, assuming n=4 and x=7, the subframe n+x represents a subframe whose subframe index is 1 in a first radio frame after a radio frame including a subframe 4.

A benefit of carrying the uplink control information in an uplink burst nearest to the downlink burst including the subframe n+3 (the subframe for carrying the scheduling information) is: the access network device can obtain the feedback information as soon as possible; because generally, a downlink burst follows the uplink burst, if the access network device receives, in the subframe n+7 or the subframe n+8, the uplink control information fed back by the terminal device, the access network device can set an appropriate MCS for downlink data in a next downlink burst according to the uplink control information, thereby enhancing efficiency of downlink data transmission on the unlicensed spectrum resource.

Implementation 3: The terminal device determines, in other subframes, a subframe in which a quantity of OFDM symbols for transmitting uplink information is not less than a specified threshold, as the uplink subframe for carrying the uplink control information. The other subframes are subframes other than the first subframe in the M uplink subframes.

The specified threshold may include being not less than a quantity of OFDM symbols that can carry the uplink control information. Using aperiodic CSI as an example, the specified threshold may include 14 OFDM symbols. A benefit of this practice is that transmission efficiency of the uplink control information can be ensured; in addition, it may be further specified that a design criterion of an existing LTE system is reused for transmission of the uplink control information, so that system design is simplified.

Optionally, in addition to the first subframe, if the M uplink subframes include multiple uplink subframes satisfying the following condition: a quantity of OFDM symbols for transmitting uplink information in a subframe is not less than the specified threshold, the terminal device may use a last uplink subframe in a time sequence of the multiple uplink subframes as the uplink subframe for carrying the uplink control information. For example, if a quantity of OFDM symbols for transmitting uplink information in the last uplink subframe (for example, the subframe n+7 in FIG. 4) in the time sequence of the M uplink subframes is less than 14, but a quantity of OFDM symbols for transmitting uplink information in the penultimate uplink subframe in the time sequence of the M uplink subframes is equal to 14, the terminal device may determine the penultimate uplink subframe in the time sequence of the M uplink subframes as the uplink subframe for carrying the uplink control information.

In this embodiment of the present disclosure, the terminal device may determine, according to the scheduling information or other indication information, a quantity of OFDM symbols for transmitting uplink information in each scheduled uplink subframe, and may further determine a relationship between the quantity of OFDM symbols for transmitting uplink information and the specified threshold. If the determined quantity of OFDM symbols is not less than the specified threshold, the corresponding uplink subframe may be used to transmit uplink information. Further, the terminal device may use a first uplink subframe satisfying the relationship with the specified threshold, in the time sequence (time sequence relationship) of the determined uplink subframes, as the uplink subframe for transmitting the uplink control information, and a benefit of this practice is that the access network device can obtain the channel state information earlier. Alternatively, the terminal device may use a last uplink subframe satisfying the relationship with the specified threshold, in the time sequence of the determined uplink subframes, as the uplink subframe for transmitting the uplink control information, and a benefit of this practice is that an opportunity for transmitting the uplink control information can be ensured, as described above. With reference to FIG. 3, when the access network device sends the scheduling information by using the subframe n, it may be assumed that the terminal device can obtain an unlicensed spectrum resource through contention before the subframe n+4. Therefore, uplink data that is scheduled by the scheduling information sent by the access network device with respect to the subframe n+5 to the subframe n+7 may be transmitted in 14 OFDM symbols. After the terminal device receives the scheduling information or indication information, the terminal device may determine that quantities of OFDM symbols for transmitting uplink information in the subframe n+5 to the subframe n+7 are not less than the specified threshold (for example, 14 OFDM symbols). In this case, any one of the subframe n+5 to the subframe n+7 may be used as the uplink subframe for carrying the uplink control information in this embodiment of the present disclosure. Still with reference to FIG. 4, when the access network device sends the scheduling information by using the subframe n, it may be assumed that the terminal device can obtain an unlicensed spectrum resource through contention before the subframe n+4; in addition, it is considered that the access network device sends downlink information after the subframe n+7. Therefore, a quantity of OFDM symbols for transmitting uplink information in the subframe n+7 is less than 14. Therefore, uplink data that is scheduled by the scheduling information sent by the access network device with respect to the subframe n+5 and the subframe n+6 may be transmitted in 14 OFDM symbols, but uplink data that is scheduled by the scheduling information sent with respect to the subframe n+7 can be transmitted only in a part of OFDM symbols. After the terminal device receives the scheduling information or indication information, the terminal device may determine that quantities of OFDM symbols for transmitting uplink information in the subframe n+5 and the subframe n+6 are not less than the specified threshold, but the quantity of OFDM symbols for transmitting uplink information in the subframe n+7 is less than the specified threshold. In this case, the terminal device may determine the subframe n+6 as the uplink subframe for carrying the uplink control information.

In this embodiment of the present disclosure, the specified threshold may be specified by a standard protocol, or notified by using higher layer signaling. The higher layer signaling includes radio resource control (RRC) signaling, or includes Medium Access Control (MAC) signaling. However, this also does not exclude notifying the threshold by using physical layer signaling.

Implementation 4: The terminal device receives the scheduling information in the subframe n; and the terminal device determines, in the M uplink subframes except the first subframe, any uplink subframe within same maximum channel occupancy time (MCOT) as the subframe n, as the uplink subframe for carrying the uplink control information. Optionally, the terminal device may determine, in the M uplink subframes except the first subframe, a last or penultimate uplink subframe within the same MCOT as the subframe n, as the uplink subframe for carrying the uplink control information; or optionally, the terminal device may determine, in the M uplink subframes except the first subframe, a last or penultimate uplink subframe in a time sequence of uplink subframes that are within the same MCOT as the subframe n and in which quantities of OFDM symbols for transmitting uplink information are not less than a specified threshold, as the uplink subframe for carrying the uplink control information.

Figure 8:
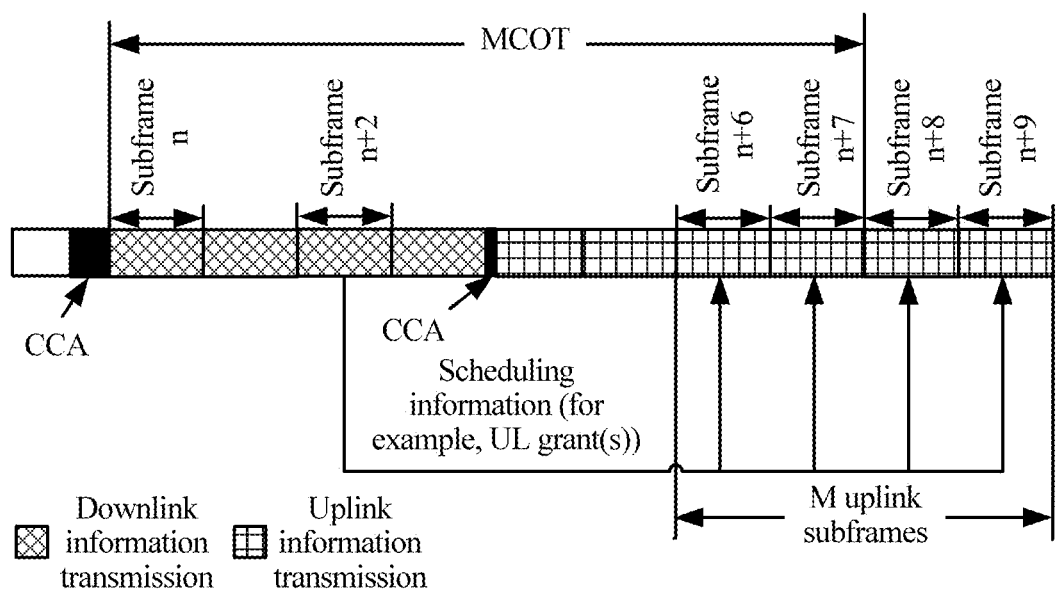
FIG. 8 is a schematic diagram of another relationship between subframes in multi-subframe scheduling.

As shown in FIG. 8, assuming that the access network device starts to transmit downlink information in the subframe n, and that MCOT in the unlicensed spectrum is set to 8 ms, a time range included in the MCOT starts from a subframe start boundary of the subframe n and ends at a subframe start boundary of a subframe n+8. Further, assuming that the terminal device receives the scheduling information in a subframe n+2, where the scheduling information instructs the terminal device to transmit the uplink data in the subframe n+6, the subframe n+7, the subframe n+8, and a subframe n+9, in the implementation 4, the terminal device may determine the subframe n+7 as the uplink subframe for carrying the uplink control information. In the implementation 4, the terminal device may use a CCA of a high priority within the MCOT. Therefore, the terminal device can obtain an unlicensed spectrum resource through contention more easily, thereby further ensuring transmission of the uplink control information. Compared with a CCA of a low priority, the CCA of the high priority can be used to obtain an unlicensed spectrum resource more easily. For example, the CCA of the high priority may be LBT not including a random backoff parameter, for example, one-shot LBT.

Figure 9:
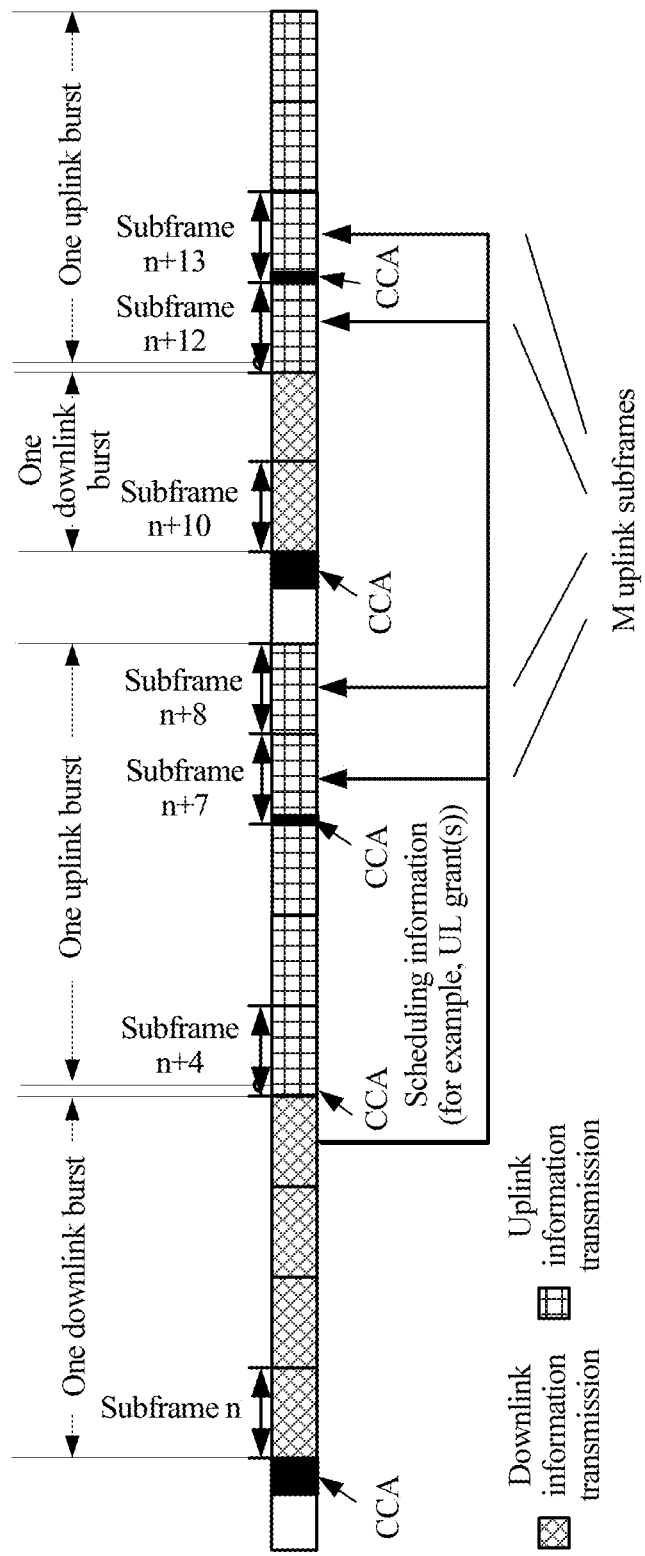
FIG. 9 is a schematic diagram of another relationship between subframes in multi-subframe scheduling.

Implementation 5: The terminal device receives the scheduling information in the subframe n; and the terminal device determines, in the M uplink subframes except the first subframe, any subframe that does not require a clear channel assessment (CCA), as the uplink subframe for carrying the uplink control information. Optionally, in the M uplink subframes except the first subframe, the determined uplink subframe for carrying the uplink control information is a first uplink subframe in a time sequence of uplink subframes that do not require CCAs. Optionally, in the M uplink subframes except the first subframe, the determined uplink subframe for carrying the uplink control information is a first uplink subframe in a time sequence of uplink subframes that do not require CCAs and in which quantities of OFDM symbols for transmitting uplink information are not less than the specified threshold. As shown in FIG. 9, the terminal device receives, in a subframe n+3, the scheduling information sent by the access network device, and the scheduling information instructs the terminal device to transmit the uplink data in the subframe n+7, a subframe n+8, a subframe n+12, and a subframe n+13. For the uplink subframe n+12, because the uplink subframe n+12 is immediately adjacent to a last downlink subframe in a downlink burst, if a time difference between a start boundary of time for transmitting uplink information in the uplink subframe and an end boundary of time for transmitting downlink information in the last downlink subframe is less than a specific threshold (for example, the specific threshold may be 16 microseconds), when the terminal device transmits scheduled uplink data in the subframe n+12, the terminal device may transmit uplink information by direct using an unlicensed spectrum resource without performing a CCA. Further, duration of uplink information transmission performed without a CCA is generally limited, for example, is 1 ms. Therefore, when the terminal device transmits scheduled uplink data in the subframe n+13, the terminal device determines, by performing a CCA, whether an unlicensed spectrum resource is available.

In the implementation 5, the terminal device may determine the uplink subframe n+12 as the uplink subframe for carrying the uplink control information. A benefit of this practice is: the terminal device does not need to perform a CCA to determine whether uplink information can be transmitted in the subframe n+12; conversely, the terminal device can transmit the uplink control information directly by using the subframe n+12, and therefore, an opportunity for transmitting the uplink control information can be ensured. It should be noted that, in FIG. 9, although a CCA corresponding to the uplink subframe n+8 is not included, whether the CCA corresponding to the uplink subframe n+8 exists depends on whether the terminal device can obtain an unlicensed spectrum resource through contention in the uplink subframe n+7. If the terminal device obtains an unlicensed spectrum resource through contention in the uplink subframe n+7, the CCA corresponding to the uplink subframe n+8 does not exist. Conversely, if the terminal device fails to obtain an unlicensed spectrum resource through contention in the subframe n+7, the CCA corresponding to the uplink subframe n+7 exists. In other words, there is a probability that the CCA corresponding to the uplink subframe n+8 does not exist. It is stressed that, in the implementation 5, the CCA corresponding to the uplink subframe for carrying the uplink control information is determined as nonexistent. Therefore, in the implementation 5, the uplink subframe n+8 is an uplink subframe that is not suitable for carrying the uplink control information. It should be noted that, in this embodiment of the present disclosure, that the CCA corresponding to the uplink subframe exists means that before the terminal device transmits uplink information in the uplink subframe, the terminal device first determines, by performing the CCA, whether an unlicensed spectrum resource is available. That the CCA corresponding to the uplink subframe does not exist means that before the terminal device transmits uplink information in the uplink subframe, the terminal device can directly use an unlicensed spectrum resource, without determining availability of the unlicensed spectrum resource by performing the CCA.

It should be pointed out that, the implementation 1, the implementation 2, the implementation 4, or the implementation 5 may be used in combination with the implementation 3. For example, the last subframe in the time sequence of the M uplink subframes or the penultimate subframe in the time sequence, when the quantity of OFDM symbols for transmitting uplink information is not less than the specified threshold, may be used as the uplink subframe for carrying the uplink control information. For example, the last or penultimate uplink subframe in the time sequence of the uplink burst, when the quantity of OFDM symbols for transmitting uplink information is not less than the specified threshold, may be used as the uplink subframe for carrying the uplink control information. For another example, any one of the M uplink subframes except the first subframe, within the same MCOT as the downlink subframe including the scheduling information, when the quantity of OFDM symbols for transmitting uplink information is not less than the specified threshold, may be used as the uplink subframe for carrying the uplink control information. For another example, any subframe that does not require a clear channel assessment, in the M uplink subframes except the first uplink subframe, when the quantity of OFDM symbols for transmitting uplink information is not less than the specified threshold, may be used as the uplink subframe for carrying the uplink control information.

It should be noted that, with respect to the uplink subframe for carrying the uplink control information, determined in the implementation 1 to the implementation 5, because the position of the uplink subframe is determined, even if interference caused by a hidden node exists in the unlicensed spectrum, the access network device and the terminal device do not have different understandings about the uplink subframe for carrying the uplink control information. Therefore, proper transmission of the uplink control information is ensured. The hidden node herein includes a node (the node is sending data) that the terminal device fails to listen to in a CCA process when a CCA process is performed before the terminal device sends uplink information to the access network device. If data sent by the node causes interference to reception when the access network device receives the uplink information sent by the terminal device, this node may be considered as a hidden node for the terminal device.

The foregoing embodiment is described from a perspective of the terminal device. In this embodiment, the access network device may send indication information, where the indication information indicates the uplink subframe for carrying the uplink control information, and the uplink subframe is a subframe other than the first subframe in the M uplink subframes. Optionally, the uplink subframe has features defined by the foregoing embodiment of the terminal device.

Corresponding to the foregoing method, the present disclosure provides a terminal device. The terminal device may be applied to a multi-subframe scheduling scenario in a U-LTE system, and the terminal device may perform each step in the foregoing method embodiment.

Figure 10:
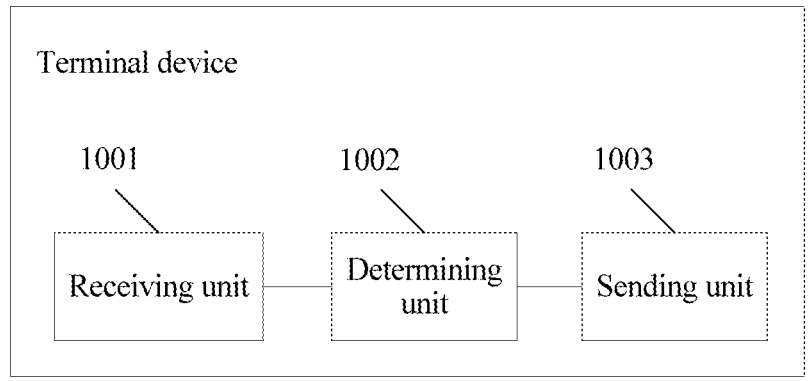
FIG. 10 is a schematic structural diagram of an embodiment of a terminal device according to an embodiment of the present disclosure.

Referring to FIG. 10, in an embodiment, the terminal device includes a receiving unit 1001, configured to receive scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information. The terminal device includes a determining unit 1002, configured to determine, in the M uplink subframes, an uplink subframe for carrying the uplink control information, where the determined uplink subframe is a subframe other than a first subframe in the M uplink subframes, and the first subframe is a first uplink subframe in the M uplink subframes. The terminal device includes a sending unit 1003, configured to send the uplink control information in the determined uplink subframe.

In an embodiment, the uplink subframe determined by the determining unit is a last subframe in a time sequence of the M uplink subframes or a penultimate subframe in a time sequence.

In an embodiment, the receiving unit receives the scheduling information in a subframe n; and the determining unit is configured to determine a last or penultimate uplink subframe in a time sequence of an uplink burst included in the M uplink subframes as the uplink subframe for carrying the uplink control information, where the uplink burst refers to multiple uplink subframes that are occupied consecutively in time, and the uplink burst is after a downlink burst including the subframe n and is immediately adjacent to the downlink burst including the subframe n.

In an embodiment, a quantity of OFDM symbols for transmitting uplink information in the uplink subframe determined by the determining unit is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

For definitions and functions of the scheduling information, the trigger information, the uplink control information, and the M uplink subframes in the terminal device embodiment, refer to related descriptions in the foregoing method embodiment. For specific implementation details about determining, in the M uplink subframes, the uplink subframe for carrying the uplink control information in the terminal device embodiment, refer to related descriptions in the foregoing method embodiment.

Figure 11:
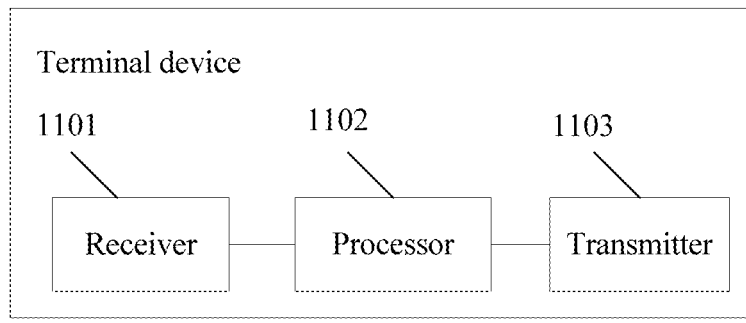
FIG. 11 is a schematic structural diagram of another embodiment of a terminal device according to an embodiment of the present disclosure.

Referring to FIG. 11, in another embodiment, the terminal device includes a receiver 1101, configured to receive scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information. The terminal device includes a processor 1102, configured to determine, in the M uplink subframes, an uplink subframe for carrying the uplink control information, where the determined uplink subframe is a subframe other than a first subframe in the M uplink subframes, and the first subframe is a first uplink subframe in the M uplink subframes. The terminal device includes a transmitter 1103, configured to send the uplink control information in the determined uplink subframe.

In an embodiment, the uplink subframe determined by the determining unit is a last subframe in a time sequence of the M uplink subframes or a penultimate subframe in a time sequence.

In an embodiment, the receiving unit receives the scheduling information in a subframe n; and the determining unit is configured to determine a last or penultimate uplink subframe in a time sequence of an uplink burst included in the M uplink subframes as the uplink subframe for carrying the uplink control information, where the uplink burst refers to multiple uplink subframes that are occupied consecutively in time, and the uplink burst is after a downlink burst including the subframe n and is immediately adjacent to the downlink burst including the subframe n.

In an embodiment, a quantity of OFDM symbols for transmitting uplink information in the uplink subframe determined by the determining unit is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

For definitions and functions of the scheduling information, the trigger information, the uplink control information, and the M uplink subframes in the terminal device embodiment, refer to related descriptions in the foregoing method embodiment. For specific implementation details about determining, in the M uplink subframes, the uplink subframe for carrying the uplink control information in the terminal device embodiment, refer to related descriptions in the foregoing method embodiment.

Embodiment 2

To ensure an opportunity for reporting uplink control information and improve efficiency of transmitting downlink data in an unlicensed spectrum, the present disclosure provides an embodiment of a method for transmitting uplink control information. This embodiment may be applied to a multi-subframe scheduling scenario in a U-LTE (LTE over unlicensed spectrum) system. It should be noted that, the U-LTE system is an LTE system working in the unlicensed spectrum, and may include an LTE system (LAA-LTE system) that uses a licensed band resource and an unlicensed spectrum resource jointly in a CA mode, or may include an LTE system that uses a licensed band resource and an unlicensed spectrum resource jointly in a dual connectivity (DC) mode, or may include an LTE system (standalone U-LTE) that is independently deployed in an unlicensed spectrum resource.

Figure 12:
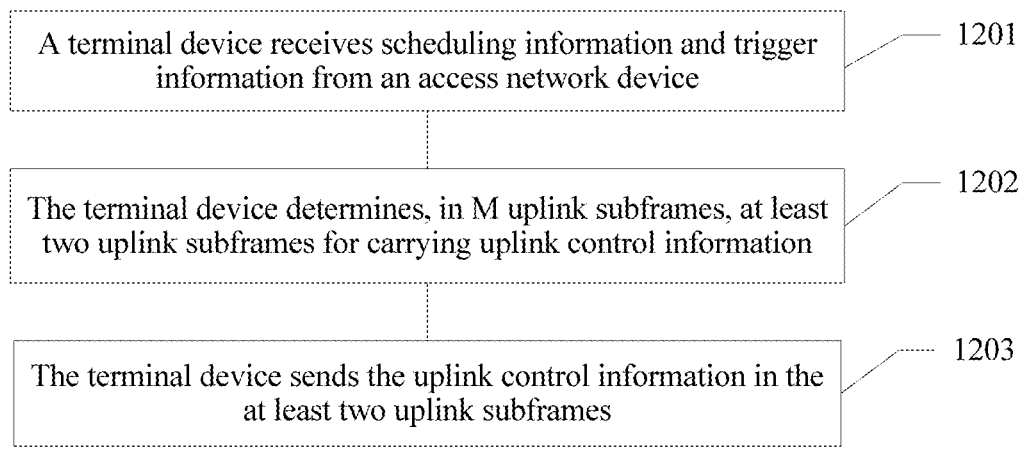
FIG. 12 is a schematic flowchart of a method for transmitting uplink control information according to another embodiment of the present disclosure.

Referring to FIG. 12, the present disclosure provides an embodiment of a method for transmitting uplink control information. The method may be applied to an LTE system working in an unlicensed spectrum. The method includes the following steps.

S1201. A terminal device receives scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information.

S1202. The terminal device determines, in the M uplink subframes, at least two uplink subframes for carrying the uplink control information.

S1203. The terminal device sends the uplink control information in the at least two uplink subframes.

For definitions and functions of the scheduling information, the trigger information, and the uplink control information in this embodiment, refer to related descriptions in Embodiment 1. Details are not further described herein.

In an embodiment, the scheduling information and the trigger information are carried in same downlink control information. For example, both the scheduling information and the trigger information are carried in a UL grant.

In an embodiment, the scheduling information and the trigger information are carried in a same downlink subframe. In this embodiment of the present disclosure, the scheduling information and the trigger information used to instruct the terminal device to send the uplink control information are carried in a same subframe; or optionally, a subframe including the trigger information precedes a subframe including the scheduling information in a time sequence, and certainly, this also does not exclude that the subframe including the trigger information follows the subframe including the scheduling information and precedes a first uplink subframe in the M uplink subframes in a time sequence.

In this embodiment, because the at least two subframes in the M uplink subframes for transmitting the uplink data are used to carry the uplink control information, the uplink control information can be fed back as soon as possible; and/or because the uplink control information is carried in multiple uplink subframes separately, occupancy of excessive uplink resources for uplink data transmission in a scheduled uplink subframe can be avoided.

Figure 13:
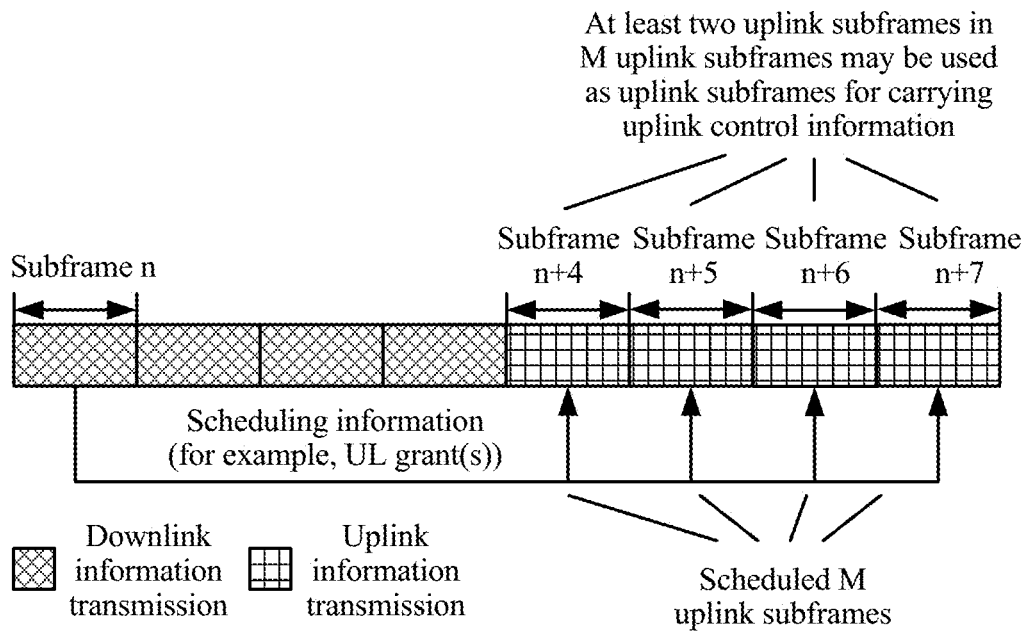
FIG. 13 is a schematic diagram of another relationship between subframes in multi-subframe scheduling.

A diagram of a relationship between subframes in multi-subframe scheduling shown in FIG. 13 is used as an example to describe a specific implementation of this embodiment of the present disclosure. It is assumed that the terminal device receives, in a subframe n, uplink scheduling grant UL grant information sent by the access network device, where the information schedules the terminal device to send scheduled uplink data in a subframe n+4, a subframe n+5, a subframe n+6, and a subframe n+7, and the uplink data is carried in a PUSCH. In this case, any two of the subframe n+4, the subframe n+5, the subframe n+6, and the subframe n+7 may be used to transmit the uplink control information. Optionally, assuming that the subframe n+4 and the subframe n+5 are the subframes that may be used to transmit the uplink control information, in this embodiment of the present disclosure, if the terminal device fails to obtain an unlicensed spectrum resource through contention in the subframe n+4, the terminal device may further determine, in the subframe n+5, whether an unlicensed spectrum resource is obtained through contention, and further determine whether uplink control information can be transmitted in the subframe n+5. On the other hand, if the terminal device obtains an unlicensed spectrum resource through contention in the subframe n+4, the terminal device may transmit uplink control information in the subframe n+4, and the terminal device continues to transmit uplink control information in the subframe n+5.

Optionally, in this solution, before the terminal device transmits uplink information in any one of the M uplink subframes, the terminal device determines, by performing a CCA, whether an unlicensed spectrum resource can be obtained through contention. In other words, before the terminal device transmits uplink information in the first uplink subframe in the M uplink subframes, the terminal device determines, by performing a CCA, whether an unlicensed spectrum resource can be obtained through contention. In an uplink subframe other than the first uplink subframe in the M uplink subframes, whether a CCA is to be performed to determine whether an unlicensed spectrum resource can be obtained through contention depends on whether an unlicensed spectrum resource is obtained through contention in a CCA corresponding to an uplink subframe before the other uplink subframe. For example, using FIG. 13 as an example, whether the terminal device performs a CCA to determine availability of an unlicensed spectrum resource before transmitting uplink information in the subframe n+5 depends on whether the terminal device obtains an unlicensed spectrum resource through contention in the subframe n+4. If the terminal device obtains an unlicensed spectrum resource through contention before transmitting uplink information in the subframe n+4 (which may be understood as "the terminal device obtains an unlicensed spectrum resource through contention in the subframe n+4), the terminal device may not need to perform a CCA to contend for an unlicensed spectrum resource before transmitting uplink information in the subframe n+5. Conversely, if the terminal device fails to obtain an unlicensed spectrum resource through contention before transmitting uplink information in the subframe n+4 (e.g., the terminal device fails to obtain an unlicensed spectrum resource through contention in the subframe n+4), the terminal device performs a CCA to contend for an unlicensed spectrum resource before transmitting uplink information in the subframe n+5. Likewise, whether the terminal device performs a CCA to determine availability of an unlicensed spectrum resource before transmitting uplink information in the subframe n+6 may depend on whether the terminal device obtains an unlicensed spectrum resource through contention in the subframe n+4 and/or the subframe n+5.

In this embodiment, the terminal device may determine, in the M uplink subframes in multiple manners, the at least two uplink subframes for carrying the uplink control information.

Implementation 1: The at least two uplink subframes include at least one of a last subframe in a time sequence of the M uplink subframes and a penultimate subframe in the time sequence.

Implementation 2: The terminal device receives the scheduling information in the subframe n; and the at least two uplink subframes include at least one of a last uplink subframe and a penultimate uplink subframe in a time sequence of an uplink burst, where the uplink burst refers to multiple uplink subframes that are occupied consecutively in time and included in the M uplink subframes, and the uplink burst is after a downlink burst including the subframe n and is immediately adjacent to the downlink burst including the subframe n.

More generally, in this embodiment of the present disclosure, the terminal device determines any two uplink subframes in the uplink burst as uplink subframes included in the at least two uplink subframes, where neither of the any two uplink subframes is the first uplink subframe in the M uplink subframes.

Implementation 3: The at least two uplink subframes include the first subframe in a time sequence of the M uplink subframes.

Implementation 4: Quantities of OFDM symbols for transmitting uplink information in the at least two uplink subframes are not less than a specified threshold.

Implementation 5: The terminal device receives the scheduling information in the subframe n; and in the M uplink subframes, the at least two uplink subframes include any uplink subframe within same maximum channel occupancy time (MCOT) as the subframe n. Optionally, in the M uplink subframes, the at least two uplink subframes include a last or penultimate uplink subframe within the same MCOT as the subframe n, as an uplink subframe for carrying the uplink control information; or optionally, the terminal device may determine, in the M uplink subframes, a last or penultimate uplink subframe in a time sequence of uplink subframes that are within the same MCOT as the subframe n and in which quantities of OFDM symbols for transmitting uplink information are not less than a specified threshold, as an uplink subframe for carrying the uplink control information.

Implementation 6: The terminal device receives the scheduling information in the subframe n; and in the M uplink subframes, the at least two uplink subframes include any subframe that does not require a clear channel assessment (CCA). Optionally, in the M uplink subframes, the at least two uplink subframes include a first uplink subframe in a time sequence of uplink subframes that do not require CCAs. Optionally, in the M uplink subframes, the at least two uplink subframes include a first uplink subframe in a time sequence of uplink subframes that do not require CCAs and in which quantities of OFDM symbols for transmitting uplink information are not less than a specified threshold.

It should be pointed out that the implementation 1 to the implementation 6 may be used in combination.

In this embodiment, the method for determining the at least two uplink subframes, except the implementation 4, is similar to the method for determining the uplink subframe for carrying the uplink control information in Embodiment 1. For details about the implementation 1 to the implementation 3, the implementation 5, and the implementation 6, refer to related descriptions in Embodiment 1. Details are not further described herein.

In an embodiment, the uplink control information carried in each of the at least two uplink subframes is the same.

In another embodiment, the at least two uplink subframes include a first uplink subframe and a second uplink subframe, and uplink control information carried in the first uplink subframe is different from uplink control information carried in the second uplink subframe. Optionally, content of the uplink control information carried in the first uplink subframe does not coincide with content of the uplink control information carried in the second subframe, or content of the control information carried in the first uplink subframe includes content of the uplink control information carried in the second subframe.

The following describes this embodiment of the present disclosure by using an example in which the uplink control information is aperiodic CSI.

To better describe the solution of this embodiment, firstly, a rule for transmitting CSI (including periodic CSI and aperiodic CSI) in a scheduled uplink resource (it may be understood that the CSI is carried in a PUSCH) in the prior art is described. For ease of description, an FDD system is used as an example. It should be noted that, a difference between a TDD system and an FDD system in CSI transmission mainly lies in that not all subframes in the TDD system are uplink subframes for transmitting uplink information, and this causes CSI transmission time positions to be different.

Secondly, the CSI includes two types: periodic CSI and aperiodic CSI. The periodic CSI may be carried in a physical uplink control channel (PUCCH), or may be carried in the PUSCH. The aperiodic CSI is carried in the PUSCH, and aperiodic CSIing by aperiodic CSI trigger indication information. A case in which the CSI is carried in the PUSCH is mainly considered in this embodiment of the present disclosure.

In a single-carrier case, assuming that the terminal device performs data transmission with the access network device by using only a CC1, the data transmission may include sending data to the access network device by using the CC1, or may include receiving data sent by the access network device by using the CC1. If the terminal device receives, in a subframe k−4, uplink scheduling information (UL grant) sent by the access network device, the terminal device may transmit scheduled uplink data in a subframe k. Further, if the terminal device feeds back CSI in the subframe k, for example, if the UL grant information received in the subframe k−4 includes CSI trigger information (correspondingly, a bit corresponding to a CSI request field may be set to 1), or the terminal device determines, according to a CSI feedback time sequence configured by the access network device, that CSI is to be fed back in the subframe k, the terminal device may transmit the CSI by using a scheduled uplink resource in the subframe k.

In a multi-carrier case, it is assumed that the terminal device may perform data transmission with the access network device by using multiple carriers. For example, the terminal device may perform data transmission with the access network device by using a CC1, a CC2, a CC3, and a CC4 simultaneously. In a case of aperiodic CSI, the terminal device feeds back, according to a preset rule, CSI corresponding to a carrier or a serving cell. If the terminal device receives, in a subframe k−4 of the CC1, uplink scheduling information (UL grant) sent by the access network device, the terminal device may transmit uplink data in a subframe k of the CC1. Further, if the UL grant information includes a CSI request field, and this field instructs the terminal device to transmit uplink control information, the terminal device transmits, according to a preset rule (for example, as described in the following Table 2), in an uplink resource scheduled in the subframe k, the CSI corresponding to the serving cell corresponding to the CSI request indication information. It should be noted that, in this embodiment of the present disclosure, the concept of the serving cell is consistent with the concept of the carrier. In Table 2, the CSI request field may include two bits, and different combinations of the two bits may be used to indicate four different states. For example, when the bits included in the CSI request field are set to a state of "11", the terminal device may transmit, in the subframe k of the CC1 with reference to the foregoing example, CSI corresponding to each serving cell included in a second set of serving cells. For example, according to a higher layer configuration, in this example, a first set of serving cells (1st set of serving cells) includes the CC1 and the CC2, and the second set of serving cells (2nd set of serving cells) includes the CC3 and the CC4. In this case, when the bits included in the CSI request field are set to the state of "11", the terminal device transmits, in the subframe k, CSI corresponding to the CC3 and the CC4.

TABLE 2

Correspondence between an aperiodic CSI request field and CSIing

| Value of CSI request field (Value of CSI request field) | Correspondence |
|---|---|
| '00' | No aperiodic CSI is triggered |
| '01' | Aperiodic CSI is triggered for serving cell $^c$ |
| '10' | Aperiodic CSI is triggered for a $1^{st}$ set of serving cells configured by higher layers |
| '11' | Aperiodic CSI is triggered for a $2^{nd}$ set of serving cells configured by higher layers |

In the multi-carrier case, for a periodic CSI feedback, regardless of whether simultaneous PUCCH and PUSCH transmission is configured for the terminal device (to be specific, whether the terminal device can simultaneously transmit uplink information by using the PUSCH when transmitting the uplink control information by using the PUCCH), if the terminal device simultaneously transmits the periodic CSI and UL data that is carried in the PUSCH, the terminal device transmits the periodic CSI by using a scheduled uplink resource (a PUSCH resource for carrying the UL data). For the periodic CSI, a feedback period of CSI corresponding to each downlink carrier (for example, the CC1, the CC2, the CC3, or the CC4) that is also referred to as a serving cell, is configured independently. At the time for transmitting the periodic CSI, if UL data is scheduled in all of the multiple carriers, the terminal device transmits the CSI in a determined carrier or serving cell according to a preset rule. For example, according to the preset rule, the terminal device selects a serving cell configured with a smallest cell index (Cell Index), for transmitting the CSI.

Furthermore, in addition to the foregoing multi-carrier case in which the terminal device may determine, according to a correspondence between bit states included in the aperiodic CSI trigger indication information (CSI request field) and serving cells, to report CSI corresponding to the serving cells, the terminal device may further determine, according to a correspondence between bit states included in the CSI request field and a CSI process (CSI process(es)) configured by higher layers, to report CSI corresponding to the CSI process(es), or determine, for a specific serving cell, to report CSI corresponding to a CSI process of the serving cell; or the terminal device may further determine, according to a correspondence between a bit state included in the CSI request field and a CSI process(es) and/or {CSI process(es), CSI subframe set}-pair(s) configured by higher layers, to report CSI corresponding to the CSI process(es) and/or {CSI process(es), CSI subframe set}-pair(s).

Figure 14:
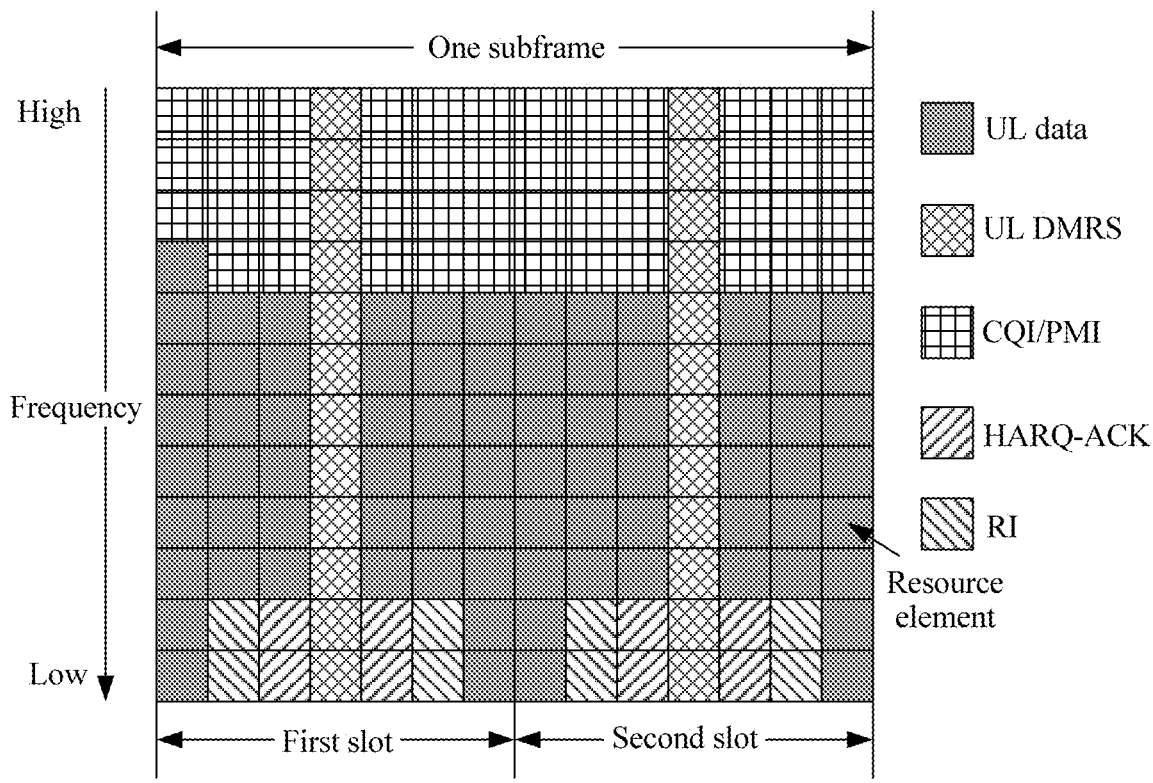
FIG. 14 is a schematic diagram of a mapping between uplink information and resource elements in a subframe.

Secondly, in resource reuse by the uplink control information (UCI) and the PUSCH, a resource reuse diagram thereof is shown in FIG. 14. The UCI herein may include a HARQ-ACK and CSI, the HARQ-ACK includes an ACK or a NACK, and the CSI includes a CQI, a PMI, and a RI.

Referring to FIG. 14, a physical resource block (PRB) pair is used as an example for description. A PRB pair is a time-frequency resource composed of one subframe in a time domain and resource elements (RE) included in 12 subcarriers in a frequency domain. In an LTE system based on an orthogonal frequency division multiple access (OFDMA) technology, a time-frequency resource is divided into OFDM symbols in a time domain dimension and OFDM subcarriers in a frequency domain dimension, and a smallest resource granularity is referred to as a RE, that is, it represents a time-frequency grid of one OFDM symbol in a time domain and one OFDM subcarrier in a frequency domain.

Specifically, when CSI and uplink data are multiplexed in a scheduled uplink resource, a quantity of resource elements occupied by the CSI in the scheduled uplink resource may be determined according to an offset indication configured by higher layers, a quantity of time-frequency resources allocated for uplink data transmission, a quantity of information bits in uplink data transmission, and a quantity of information bits to be transmitted in the CSI. For the RI, the offset indication configured by the higher layers may include $I_{offset}^{RI}$ or $I_{offset\_MC}^{RI}$. The terminal device may determine a value of $\beta_{offset}^{RI}$ according to this offset indication, and further determine a quantity of time-frequency resources that are to be occupied for transmitting the RI. For the CQI (including the PMI), the offset indication may include $I_{offset}^{CQI}$ or $I_{offset,MC}^{CQI}$. The terminal device may determine a value of $\beta_{offset}^{CQI}$ according to this offset indication, and further determine a quantity of time-frequency resources that are to be occupied for transmitting the CQI (including the PMI). Still with reference to a position of the CSI in the scheduled uplink resource in FIG. 14, REs in which the CSI should be transmitted may be determined.

When the CSI is carried in the scheduled uplink resource, resource reuse in the scheduled uplink resource is implemented in a rate matching mode by the CSI and service data transmitted by the terminal device. Therefore, for the uplink data that reuses the resource with the CSI, to ensure proper transmission of the uplink data, at least a modulation and coding scheme (MCS) corresponding to the uplink data corresponds to the uplink resource used by the terminal device for transmitting the uplink data.

In an implementation, the uplink control information carried in each of the at least two uplink subframes is the same.

Using FIG. 14 as an example, and assuming that the terminal device determines that the subframe n+6 and the subframe n+7 are used to transmit the CSI, in this implementation, uplink control information carried in the two subframes is the same. For example, for the multiple carriers, with reference to Table 2, assuming that the terminal device determines, according to the indication of the CSI request field, that CSI corresponding to the second set of serving cells is to be fed back, the terminal device feeds back, in both the subframe n+6 and the subframe n+7, the CSI corresponding to the second set of serving cells.

For multi-subframe scheduling, for example, a UL grant included in a downlink subframe may schedule the terminal device to transmit scheduled uplink data in at least two uplink subframes. To reduce signaling overheads, some information fields included in the UL grant may be reused for multiple scheduled uplink subframes, that is, one set of information fields is used. For example, resource allocation, a cyclic shift corresponding to a demodulation reference signal DMRS, and an MCS included in the UL grant and corresponding to different scheduled uplink subframes are the same. According to the foregoing principle of resource reuse by the CSI and the uplink data, given a same resource allocation indication in multi-subframe scheduling, resources used for uplink data transmission in an uplink subframe including CSI are fewer than resources used for uplink data transmission in an uplink subframe not including CSI. To ensure proper transmission of uplink data, the MCS is to be set based on uplink resources actually used for uplink data transmission in an uplink subframe including CSI. Therefore, for the uplink subframes that do not include CSI transmission, because many uplink resources are actually used for uplink data transmission, given the same MCS, redundant uplink resources exist in the uplink subframes not including CSI, and uplink resource waste is caused. In this case, to maximally reduce control signaling overheads and reduce resource waste, all the scheduled multiple uplink subframes may include CSI. This issue is also applicable to uplink control information that is an SRS or a HARQ-ACK. To be specific, in the scheduled multiple uplink subframes, uplink time-frequency resources used for uplink data transmission in an uplink subframe including an SRS are different from uplink time-frequency resources used for uplink data transmission in an uplink subframe not including an SRS, and uplink time-frequency resources used for uplink data transmission in an uplink subframe including a HARQ-ACK are different from uplink time-frequency resources used for uplink data transmission in an uplink subframe not including a HARQ-ACK.

In another embodiment, the at least two uplink subframes include the first uplink subframe and the second uplink subframe, the uplink control information carried in the first uplink subframe is different from the uplink control information carried in the second subframe, and the content of the uplink control information carried in the first uplink subframe does not coincide with the content of the uplink control information carried in the second subframe.

An advantage of using this manner is: not only relatively low control signaling overheads can be ensured, but also relatively few resources can be reserved for CSI transmission in an uplink subframe including CSI transmission, because different CSI is allocated to different uplink subframes. This may further reduce uplink resource waste.

In this embodiment of the present disclosure, that transmitted CSI is different includes at least one of the following: content of the transmitted CSI is different, serving cells corresponding to the transmitted CSI are different, CSI processes corresponding to the transmitted CSI are different, or subframe sets corresponding to the transmitted CSI are different. Herein, the content of the transmitted CSI includes at least one of a CQI, a PMI, or a RI.

That the content of the transmitted CSI does not coincide means that the uplink control information carried in the first uplink subframe is completely different from the uplink control information carried in the second uplink subframe.

Using FIG. 14 as an example, and assuming that the terminal device determines to transmit CSI in the subframe n+6 and the subframe n+7, in this embodiment of the present disclosure, specifically, the following implementations are used for description. It should be noted that, the implementation of the present disclosure is not limited thereto. Optionally, (1) In the single-carrier case, that is, if only a single carrier is configured for the terminal device, the terminal device may transmit one of a RI, a CQI, or a PMI in the subframe n+6 and the subframe n+7, and the CSI transmitted by the terminal device in the subframe n+6 and the subframe n+7 is different. For example, the CQI or the PMI is transmitted in the subframe n+6, and the RI is transmitted in the subframe n+7; or considering a priority of uplink control information included in the CSI, the RI may be transmitted in the subframe n+6, and the CQI is transmitted in the subframe n+7.

(2) In the multi-carrier case, that is, if multiple carriers are configured (or activated) for the terminal device, for example, the terminal device may transmit data to the access network device simultaneously by using the CC1, the CC2, the CC3, or the CC4; and according to the higher layer configuration, the first set of serving cells (1st set of serving cells) includes the CC1 and the CC2, and the second set of serving cells (2nd set of serving cells) includes the CC3 and the CC4. With reference to Table 2, when the bits included in the CSI request field are set to the state of "11", the terminal device may determine that CSI corresponding to the second set of serving cells is to be fed back. In this implementation, the terminal device may feed back, in the first uplink subframe (for example, the subframe n+6), CSI corresponding to the CC3, and feed back, in the second uplink subframe (for example, the subframe n+7), CSI corresponding to the CC4; or the terminal device may feed back, in the first uplink subframe, CSI corresponding to the CC3 and CC4, and feed back, in the second uplink subframe, CSI corresponding to the CC1 and the CC2; or the terminal device may feed back, in the first uplink subframe, RIs corresponding to the CC3 and the CC4, and feed back, in the second uplink subframes, CQIs or PMIs corresponding to the CC3 and the CC4; or the terminal device may feed back, in the first uplink subframe, RIs corresponding to the CC1 to the CC4, and feed back, in the second uplink subframe, CQIs or PMIs corresponding to the CC1 to the CC4.

(3) For another example, assuming that multiple CSI processes (CSI processes) are configured for the terminal device, the terminal device may add, to different uplink subframes respectively, CSI corresponding to CSI processes and triggered for reporting. For example, assuming that six CSI processes are configured by higher layers for the terminal device, the terminal device may determine, according to a correspondence specified in Table 3, reporting for CSI processes corresponding to different CSI request field indications. Assuming that the CSI request field is '100', according to the correspondence in Table 3, the terminal device determines that CSI corresponding to a third set of CSI process(es) is to be reported. In one manner, if the third set of CSI process(es) includes more than one CSI process, the terminal device may add CSI to different uplink subframes according to each CSI process included in the third set of CSI processes or according to another rule (for example, the third set of CSI processes is divided into groups, where one group includes two CSI processes). In another manner, a set composed of a RI corresponding to each CSI process is transmitted in the first uplink subframe, and a set composed of a CQI or a PMI corresponding to each CSI process is transmitted in the second uplink subframe. In another manner, first, CSI corresponding to the third set of CSI processes is transmitted in one uplink subframe, and then CSI corresponding to another set of CSI processes is transmitted in another uplink subframe according to a preset rule. For example, CSI corresponding to a fourth set of CSI processes is transmitted in another uplink subframe.

TABLE 3

Correspondence between an aperiodic CSI request field and CSIing

| Value of CSI request field (Value of CSI request field) | Correspondence |
|---|---|
| '000' | No aperiodic CSI is triggered |
| '001' | Aperiodic CSI is triggered for a set of CSI process(es) configured by higher layers for serving cell $c$ |
| '010' | Aperiodic CSI is triggered for a $1^{st}$ set of CSI process(es) configured by higher layers |
| '011' | Aperiodic CSI is triggered for a $2^{nd}$ set of CSI process(es) configured by higher layers |
| '100' | Aperiodic CSI is triggered for a $3^{rd}$ set of CSI process(es) configured by higher layers |
| '101' | Aperiodic CSI is triggered for a $4^{th}$ set of CSI process(es) configured by higher layers |
| '110' | Aperiodic CSI is triggered for a $5^{th}$ set of CSI process(es) configured by higher layers |
| '111' | Aperiodic CSI is triggered for a $6^{th}$ set of CSI process(es) configured by higher layers |

In another embodiment, the at least two uplink subframes include the first uplink subframe and the second uplink subframe, and the uplink control information carried in the first uplink subframe is different from the uplink control information carried in the second uplink subframe. In addition, the content of the control information carried in the first uplink subframe includes the content of the uplink control information carried in the second uplink subframe.

In this implementation, that the content of the control information carried in the first uplink subframe includes the content of the uplink control information carried in the second subframe includes: CSI carried in the second uplink subframe is a proper subset of CSI carried in the first uplink subframe.

Using FIG. 14 as an example, and assuming that the terminal device determines to transmit CSI in the subframe n+6 and the subframe n+7, in this embodiment of the present disclosure, specifically, the following specific implementations are used for description. It should be noted that, the implementation of the present disclosure is not limited thereto. Optionally, (1) In the single-carrier case, that is, if only a single carrier is configured for the terminal device, the terminal device may transmit a RI in one (corresponding to the second uplink subframe) of the subframe n+6 and the subframe n+7, and transmit a RI and a CQI or a PMI in another subframe (corresponding to the first uplink subframe).

(2) In the multi-carrier case, that is, if multiple carriers are configured (or activated) for the terminal device, for example, the terminal device may transmit data to the access network device simultaneously by using the CC1, the CC2, the CC3, or the CC4; and according to the higher layer configuration, the first set of serving cells (1st set of serving cells) includes the CC1 and the CC2, and the second set of serving cells (2nd set of serving cells) includes the CC3 and the CC4. With reference to Table 2, when the bits included in the CSI request field are set to the state of "11", the terminal device may determine that CSI corresponding to the second set of serving cells is to be fed back. In this optional implementation, the terminal device may feed back, in one uplink subframe (corresponding to the first uplink subframe) in multiple determined subframes, CSI corresponding to the CC3 and the CC4, and feed back, in another uplink subframe (corresponding to the second uplink subframe), CSI corresponding to the CC3 and the CC4; or the terminal device may feed back, in one uplink subframe (corresponding to the second uplink subframe) in multiple determined subframes, some CSI corresponding to the CC3 and the CC4, and feed back, in another uplink subframe (corresponding to the first uplink subframe), all CSI corresponding to the CC3 and the CC4; or the terminal device may feed back, in one uplink subframe (corresponding to the second uplink subframe) in multiple determined subframes, all CSI corresponding to the CC3 and the CC4, and feed back, in another uplink subframe (corresponding to the first uplink subframe), all CSI corresponding to the CC1 to the CC4.

(3) If multiple CSI processes are configured for the terminal device, the terminal device may add, to one uplink subframe according to indication information (for example, CSI processes indicated by the CSI request field), CSI corresponding to some CSI processes in determined CSI processes, and add, to another uplink subframe, CSI corresponding to all determined CSI processes. Alternatively, based on Table 3, if the CSI request field is set to "110", the terminal device may feed back, in one uplink subframe, CSI corresponding to a fifth set of CSI processes, and feed back, in another uplink subframe, CSI corresponding to the fifth set of CSI processes and another group of CSI processes. An offset relationship exists between the CSI request field corresponding to the another group of CSI processes and the CSI request field carried in the UL grant, and the offset relationship is indicated implicitly, for example, preconfigured (for example, specified by the standard protocol), or may be indicated by using explicit signaling, where the explicit signaling may be higher layer signaling, or may be physical layer signaling. This is not specifically limited in this embodiment of the present disclosure.

A benefit of using this embodiment is: resource waste is reduced maximally, and it is ensured that the terminal device does not lose excessive CSI if the terminal device fails to obtain an unlicensed spectrum resource through contention in an uplink subframe for CSI transmission due to a CCA. Optionally, to reduce impact of a CCA listening result on uplink control information transmission, subsequent uplink subframe may be used to transmit more CSI.

In another embodiment, the at least two uplink subframes include the first uplink subframe and the second uplink subframe, and the uplink control information carried in the first uplink subframe is different from the uplink control information carried in the second uplink subframe. In addition, some content of the control information carried in the first uplink subframe is the same as some content of the uplink control information carried in the second uplink subframe. Optionally, the same content may be uplink control information of a higher priority, for example, a RI. A benefit of using this embodiment is: resource waste is reduced maximally, and transmission of the uplink control information of the higher priority is ensured.

In the foregoing manner, which subframes are specifically determined for transmitting CSI and which content is included in CSI transmitted in each determined subframe may be preconfigured, or may be notified by using signaling. This is not specifically limited in this embodiment of the present disclosure.

When the uplink control information is a sounding reference signal, the implementation described above is also applicable to the SRS. It should be noted that, "the uplink control information carried in each of the at least two uplink subframes is the same" may be understood as "time positions (which may be indicated by OFDM symbol indexes) and frequency resource positions occupied by SRSs transmitted in the at least two uplink subframes, and used sequences are all the same"; "the at least two uplink subframes include the first uplink subframe and the second uplink subframe, and the uplink control information carried in the first uplink subframe is different from the uplink control information carried in the second uplink subframe" may be understood as "at least one of the following included in the SRSs transmitted by the terminal device in the first uplink subframe and the second uplink subframe is different: time positions occupied by the SRSs (which may be indicated by OFDM symbol indexes), frequency resource positions occupied for transmitting the SRSs, or sequences used by the SRSs", or may be understood as "a frequency resource occupied by the terminal device for transmitting an SRS in the first uplink subframe includes a frequency resource occupied by the terminal device for transmitting an SRS in the second uplink subframe".

When the uplink control information is a hybrid automatic repeat request acknowledgement, the implementation described above is also applicable to a hybrid automatic repeat request acknowledgement (HARQ-ACK). The HARQ-ACK fed back by the terminal device may be intended for multiple uplink subframes and multiple serving cells. It should be noted that, "the uplink control information carried in each of the at least two uplink subframes is the same" may be understood as "HARQ-ACK information carried in each uplink subframe included in the at least two uplink subframes is the same"; "the at least two uplink subframes include the first uplink subframe and the second uplink subframe, and the uplink control information carried in the first uplink subframe is different from the uplink control information carried in the second uplink subframe" may be understood as "at least one of the following included in the HARQ-ACKs transmitted by the terminal device in the first uplink subframe and the second uplink subframe is different: different uplink subframes corresponding to the HARQ-ACKs, or different serving cells corresponding to the HARQ-ACKs; and "the at least two uplink subframes include the first uplink subframe and the second uplink subframe, and the uplink control information carried in the first uplink subframe is different from the uplink control information carried in the second uplink subframe" may also be understood as "a downlink subframe corresponding to a HARQ-ACK transmitted by the terminal device in the first uplink subframe includes a downlink subframe corresponding to a HARQ-ACK transmitted by the terminal device in the second uplink subframe, and/or a serving cell corresponding to a HARQ-ACK transmitted by the terminal device in the first uplink subframe includes a serving cell corresponding to a HARQ-ACK transmitted by the terminal device in the second uplink subframe".

The foregoing embodiment is described from a perspective of the terminal device. In this embodiment, the access network device may send indication information, where the indication information indicates the uplink subframes for carrying the uplink control information, and the uplink subframes are at least two uplink subframes in the M uplink subframes. Optionally, the uplink subframes have features defined by the foregoing implementation 1 to the implementation 6. In addition, the access network device may further send indication information to the terminal device, where the indication information is used to indicate which uplink control information is carried in the uplink subframes for carrying the uplink control information.

Corresponding to the foregoing method, the present disclosure provides a terminal device. The terminal device may be applied to a multi-subframe scheduling scenario in a U-LTE system, and the terminal device may perform each step in the foregoing method embodiment.

Figure 15:
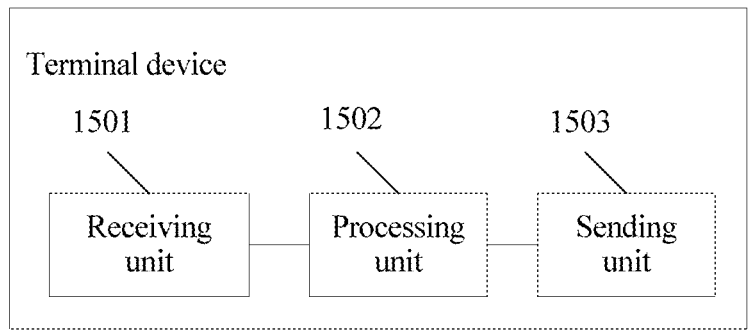
FIG. 15 is a schematic structural diagram of another embodiment of a terminal device according to an embodiment of the present disclosure.

Referring to FIG. 15, in an embodiment, the terminal device includes a receiving unit 1501, configured to receive scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information. The terminal device includes a processing unit 1502, configured to determine, in the M uplink subframes, at least two uplink subframes for carrying the uplink control information. The terminal device includes a sending unit 1503, configured to send the uplink control information in the at least two uplink subframes.

In an embodiment, the at least two uplink subframes include at least one of a last subframe in a time sequence of the M uplink subframes and a penultimate subframe in the time sequence.

In an embodiment, the receiving unit receives the scheduling information in a subframe n; and the at least two uplink subframes include at least one of a last uplink subframe and a penultimate uplink subframe in a time sequence of an uplink burst included in the M uplink subframes, where the uplink burst refers to multiple uplink subframes that are occupied consecutively in time, and the uplink burst is after a downlink burst including the subframe n and is immediately adjacent to the downlink burst including the subframe n.

In an embodiment, the at least two uplink subframes include a first subframe in the time sequence of the M uplink subframes.

In an embodiment, a quantity of OFDM symbols for transmitting uplink control information in each of the at least two uplink subframes is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

In an embodiment, the uplink control information carried in each of the at least two uplink subframes is the same.

In another embodiment, the at least two uplink subframes include a first uplink subframe and a second uplink subframe, and uplink control information carried in the first uplink subframe is different from uplink control information carried in the second uplink subframe.

In an embodiment, content of the uplink control information carried in the first uplink subframe does not coincide with content of the uplink control information carried in the second uplink subframe, or content of the control information carried in the first uplink subframe includes content of the uplink control information carried in the second uplink subframe.

For definitions and functions of the scheduling information, the trigger information, the uplink control information, and the M uplink subframes in the terminal device embodiment, refer to related descriptions in the foregoing method embodiment. For specific implementation details about determining, in the M uplink subframes, the at least two uplink subframes for carrying the uplink control information in the terminal device embodiment, refer to related descriptions in the foregoing method embodiment.

Figure 16:
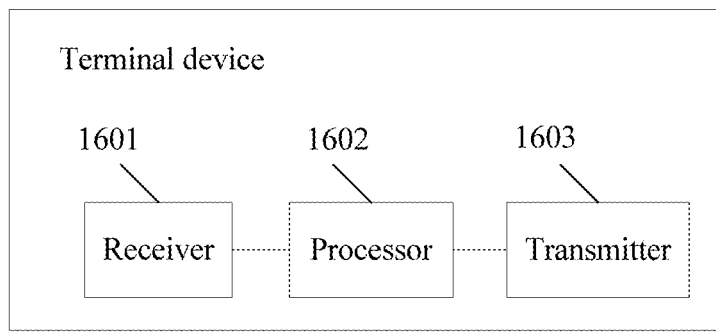
FIG. 16 is a schematic structural diagram of another embodiment of a terminal device according to an embodiment of the present disclosure.

Referring to FIG. 16, in another embodiment, the terminal device includes a receiver 1601, configured to receive scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information. The terminal device includes a processor 1602, configured to determine, in the M uplink subframes, at least two uplink subframes for carrying the uplink control information. The terminal device includes a transmitter 1603, configured to send the uplink control information in the at least two uplink subframes.

In an embodiment, the at least two uplink subframes include at least one of a last subframe in a time sequence of the M uplink subframes and a penultimate subframe in the time sequence.

In an embodiment, the receiving unit receives the scheduling information in a subframe n; and the at least two uplink subframes include at least one of a last uplink subframe and a penultimate uplink subframe in a time sequence of an uplink burst included in the M uplink subframes, where the uplink burst refers to multiple uplink subframes that are occupied consecutively in time, and the uplink burst is after a downlink burst including the subframe n and is immediately adjacent to the downlink burst including the subframe n.

In an embodiment, the at least two uplink subframes include a first subframe in the time sequence of the M uplink subframes.

In an embodiment, a quantity of OFDM symbols for transmitting uplink control information in each of the at least two uplink subframes is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

In an embodiment, the uplink control information carried in each of the at least two uplink subframes is the same.

In another embodiment, the at least two uplink subframes include a first uplink subframe and a second uplink subframe, and uplink control information carried in the first uplink subframe is different from uplink control information carried in the second uplink subframe.

In an embodiment, content of the uplink control information carried in the first uplink subframe does not coincide with content of the uplink control information carried in the second uplink subframe, or content of the control information carried in the first uplink subframe includes content of the uplink control information carried in the second uplink subframe.

For definitions and functions of the scheduling information, the trigger information, the uplink control information, and the M uplink subframes in the terminal device embodiment, refer to related descriptions in the foregoing method embodiment. For specific implementation details about determining, in the M uplink subframes, the at least two uplink subframes for carrying the uplink control information in the terminal device embodiment, refer to related descriptions in the foregoing method embodiment.

Embodiment 3

For multi-subframe scheduling, to reduce signaling overheads, scheduling information corresponding to multiple scheduled uplink subframes is usually the same, for example, resource allocation. It should be noted that, because a quantity of information bits used for resource allocation in multi-subframe scheduling may be relatively large, if different scheduled uplink subframes may be indicated by the same resource allocation, control signaling overheads are relatively low. However, because a size of an uplink resource actually used to transmit uplink data in an uplink subframe including transmission of uplink control information such as CSI is generally smaller than a size of an uplink resource used to transmit uplink data in an uplink subframe not including uplink control information such as CSI, uplink resource utilization is low. Likewise, in multi-subframe scheduling, a size of an uplink resource actually used to transmit uplink data in an uplink subframe including transmission of an SRS or a HARQ-ACK is generally smaller than a size of an uplink resource used to transmit uplink data in an uplink subframe not including transmission of an SRS or a HARQ-ACK, uplink resource utilization is also low.

To improve resource utilization, the present disclosure provides an embodiment of a method for transmitting uplink control information. This embodiment may be applied to a multi-subframe scheduling scenario in a U-LTE system.

Figure 17:
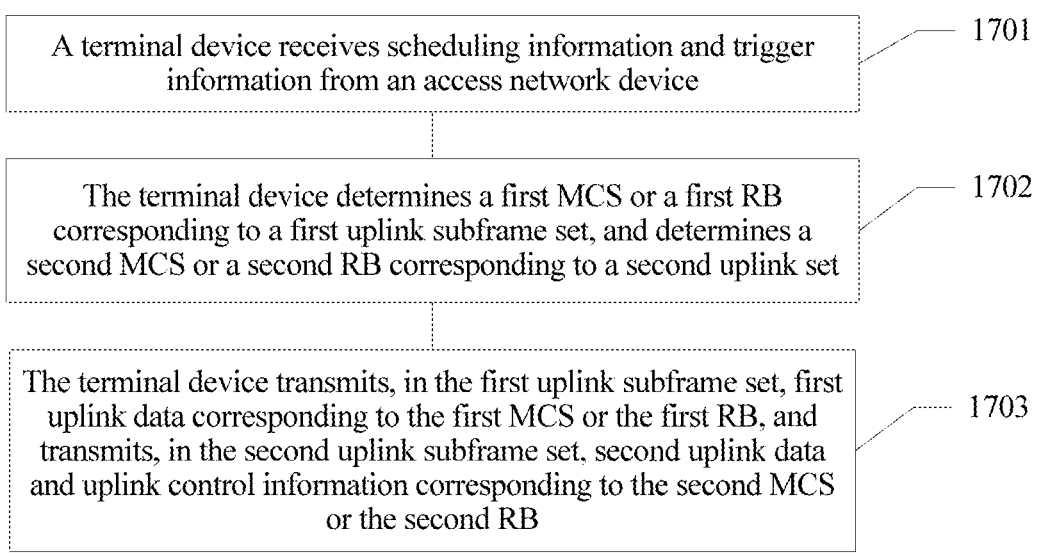
FIG. 17 is a schematic flowchart of a method for transmitting uplink control information according to another embodiment of the present disclosure.

Referring to FIG. 17, an embodiment of a method for transmitting uplink control information according to the present disclosure includes the following steps.

S1701. A terminal device receives scheduling information and trigger information from an access network device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information.

The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data.

S1702. The terminal device determines a first MCS or a first RB corresponding to the first uplink subframe set, and determines a second MCS or a second RB corresponding to the second uplink subframe set.

S1703. The terminal device transmits, in the first uplink subframe set, the first uplink data corresponding to the first MCS or the first RB, and transmits, in the second uplink subframe set, the second uplink data and the uplink control information corresponding to the second MCS or the second RB.

For definitions and functions of the scheduling information, the trigger information, and the uplink control information in this embodiment, refer to related descriptions in Embodiment 1. Details are not further described herein.

Figure 18:
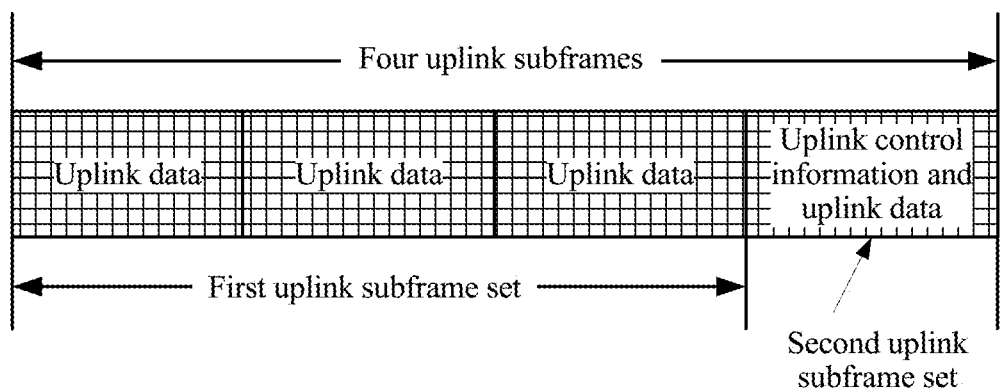
FIG. 18 is a schematic diagram of another relationship between subframes in multi-subframe scheduling.

FIG. 18 shows a relationship between a first subframe set and a second subframe set. Referring to FIG. 18, and assuming that the scheduling information instructs the terminal device to transmit the uplink data in four uplink subframes, if the terminal device determines that a last uplink subframe in the four uplink subframes includes the uplink control information, first, second, and third uplink subframes in the four uplink subframes are uplink subframes included in the first uplink subframe set; and the fourth uplink subframe is an uplink subframe included in the second uplink subframe set.

Figure 19:
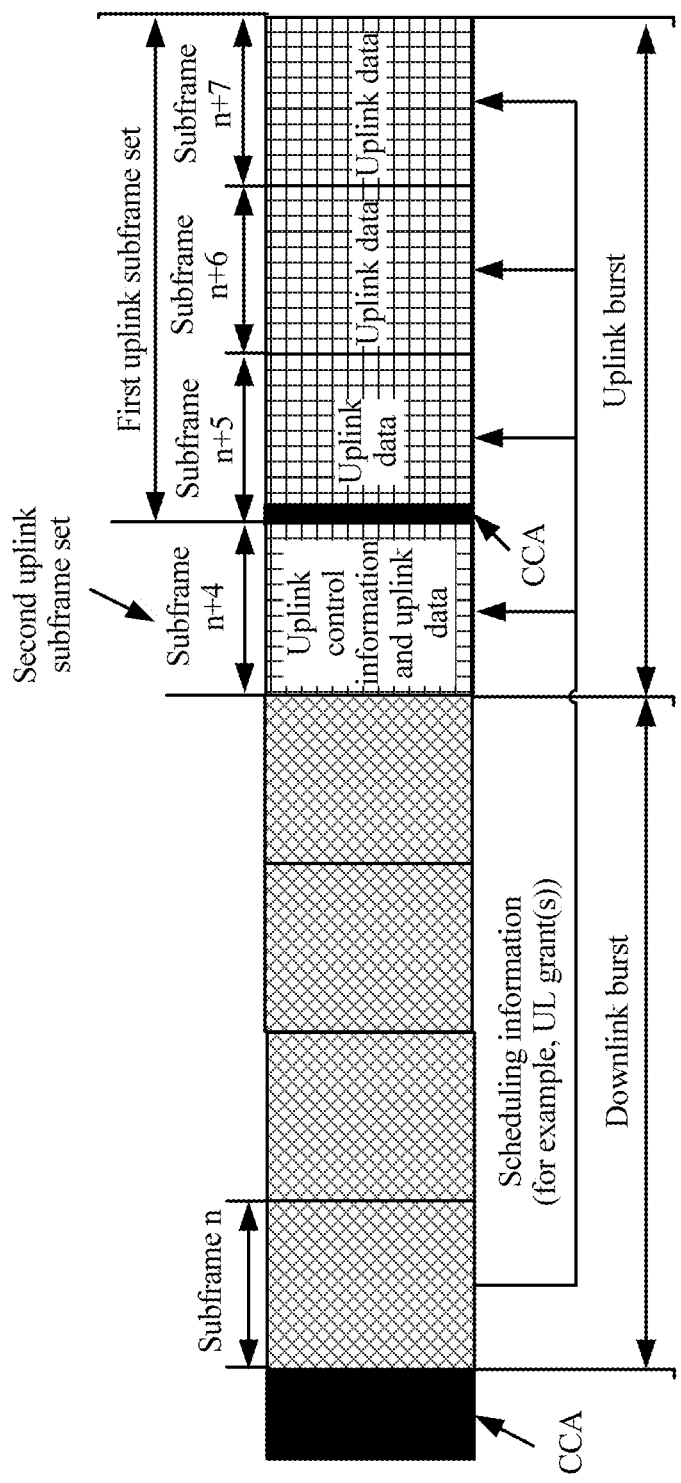
FIG. 19 is a schematic diagram of another relationship between subframes in multi-subframe scheduling.

FIG. 19 shows another relationship between a first subframe set and a second subframe set. Referring to FIG. 19, and assuming that the terminal device receives, in a subframe n, the scheduling information and trigger information sent by the access network device, where the scheduling information instructs the terminal device to transmit the uplink data in a subframe n+4, a subframe n+5, a subframe n+6, and a subframe n+7, and the subframe n+4 is a first uplink subframe that immediately follows a last downlink subframe in a downlink burst, before transmitting uplink information in the subframe n+4, the terminal device may not need to determine, by performing a CCA, whether an unlicensed spectrum resource is available. Therefore, the terminal device may determine the subframe n+4 as an uplink subframe including uplink control information, where the uplink control information is information that the trigger information instructs the terminal device to send. In this case, the second uplink subframe set includes the subframe n+4, and the first uplink subframe set includes the subframe n+5 to the subframe n+7.

In this embodiment, in a multi-subframe scheduling case, different MCSs or RBs can be determined according to actual sizes of resources respectively used to transmit uplink data in different uplink subframes. Therefore, efficiency of using uplink resources in uplink subframes carrying only uplink data can be ensured while signaling overheads in multi-subframe scheduling are reduced.

In this embodiment, the terminal device may determine the second uplink subframe set in the M uplink subframes in multiple manners.

Implementation 1: The second subframe set includes at least one of a last subframe in a time sequence of the M uplink subframes and a penultimate subframe in the time sequence.

Implementation 2: The terminal device receives the scheduling information in the subframe n; and the second subframe set includes at least one of a last uplink subframe and a penultimate uplink subframe in a time sequence of an uplink burst, where the uplink burst refers to multiple uplink subframes that are occupied consecutively in time, and the uplink burst is after a downlink burst including the subframe n and is immediately adjacent to the downlink burst including the subframe n.

Implementation 3: A quantity of OFDM symbols for transmitting uplink information in the uplink subframe in the second subframe set is not less than a specified threshold.

Implementation 4: The terminal device receives the scheduling information in the subframe n; and in the M uplink subframes except the first subframe, the second subframe set includes any uplink subframe within same maximum channel occupancy time (MCOT) as the subframe n. Optionally, in the M uplink subframes except the first subframe, the second subframe set includes a last or penultimate uplink subframe within the same MCOT as the subframe n.

Implementation 5: The terminal device receives the scheduling information in the subframe n; and in the M uplink subframes except the first subframe, the second subframe set includes any subframe that does not require a clear channel assessment (CCA), as the uplink subframe for carrying the uplink control information. Optionally, in the M uplink subframes except the first subframe, the second subframe set includes a first uplink subframe that does not require a CCA.

It should be pointed out that, the implementation 1 to the implementation 5 may be used in combination. The method for determining the uplink subframe included in the second uplink subframe set in this embodiment is similar to the method for determining the uplink subframe for carrying the uplink control information in Embodiment 1. For details about the implementation 1 to the implementation 5 in this embodiment, refer to related descriptions in Embodiment 1. Details are not further described herein. In addition, the method for determining the uplink subframe included in the second uplink subframe set in this embodiment is similar to the method for determining an uplink subframe for carrying uplink control information in Embodiment 2. For details about the implementation 1 to the implementation 5 in this embodiment, refer to related descriptions in Embodiment 2. Details are not further described herein.

The terminal device may determine, in multiple manners, the first MCS or the first RB corresponding to the first uplink subframe set.

1. The terminal device receives first indication information from the access network device, where the first indication information includes information indicating the first MCS or the first RB, and the terminal device determines the first MCS or the first RB according to the first indication information.

The first indication information may be physical layer signaling, for example, may be carried in scheduling signaling for scheduling the terminal device to transmit uplink data in the M uplink subframes, or may be higher layer information, for example, carried in radio resource control (RRC) signaling. A benefit of carrying in the scheduling signaling is: MCS indication information or RB indication information included in the existing scheduling information (for example, a UL grant) may be reused, so as to make design simple. A benefit of carrying in the higher layer signaling is that physical layer signaling overheads can be reduced.

2. The terminal device obtains an MCS offset or an RB offset; and the terminal device determines the first MCS according to the second MCS and the MCS offset; or the terminal device determines the first RB according to the second RB and the RB offset.

The MCS offset or the RB offset may be indicated by signaling, and if indicated by using signaling, the MCS offset or the RB offset may be indicated by using physical layer signaling, or may be indicated by using RRC signaling. If indicated by using signaling, optionally, a value of the MCS offset or a value of the RB offset may be indicated directly by using signaling; or optionally, an index value corresponding to the MCS offset or the RB offset may be indicated by using signaling, and then the MCS offset or the RB offset may be obtained according to a correspondence between the index value and the MCS offset or the RB offset. A benefit of indicating by using the physical layer signaling is: an MCS or an occupied frequency resource corresponding to uplink data transmitted by the terminal device can be flexibly adjusted according to quality of a channel between the access network device and the terminal device, and efficient data transmission can be ensured. A benefit of indicating by using the RRC signaling is: if a change feature of the channel between the access network device and the terminal device is relatively smooth, the MCS offset or the RB offset can be set by using the RRC signaling, and this can not only adapt to the change of the channel between the access network device and the terminal device, but also reduce physical layer signaling overheads.

Alternatively, the MCS offset or the RB offset may be preconfigured, for example, specified by a standard protocol. In this manner, signaling overheads are minimized. A change of the first MCS or the first RB may be obtained according to a change of the second MCS or the second RB.

In this manner, the second MCS or the second RB may be indicated by signaling. The signaling may be physical layer signaling, or may be RRC signaling. For example, the second MCS or the second RB may be carried in scheduling signaling for scheduling the terminal device to transmit uplink data in the M uplink subframes. A benefit of carrying in the scheduling signaling is: MCS indication information or RB indication information included in the existing scheduling information (for example, a UL grant) may be reused, so as to make design simple. A benefit of carrying in the RRC signaling is that physical layer signaling overheads can be reduced.

The terminal device determines the second MCS or the second RB, and may determine the first MCS according to the second MCS and the MCS offset, or may determine the first RB according to the second RB and the RB offset.

The terminal device may determine, in multiple manners, the second MCS or the second RB corresponding to the second uplink subframe set.

1. The terminal device receives second indication information from the access network device, where the second indication information includes information indicating the second MCS or the second RB, and the terminal device determines the second MCS or the second RB according to the second indication information.

The indication information may be physical layer signaling, for example, may be carried in scheduling signaling for scheduling the terminal device to transmit uplink data in the M uplink subframes, or may be higher layer information, for example, carried in RRC signaling. A benefit of carrying in the scheduling signaling is: MCS indication information or RB indication information included in the existing scheduling information (for example, a UL grant) may be reused, so as to make design simple. A benefit of carrying in the higher layer signaling is that physical layer signaling overheads can be reduced.

In an implementation, the first indication information and the second indication information may be carried in a same piece of signaling.

In an implementation, the first indication information and the second indication information may be carried in same downlink control information.

In an implementation, the first indication information and the second indication information may be carried in different downlink control information.

In an implementation, the first indication information and the second indication information are carried in a same downlink subframe or different downlink subframes.

2. The terminal device obtains an MCS offset or an RB offset; and the terminal device determines the second MCS according to the first MCS and the MCS offset; or the terminal device determines the second RB according to the first RB and the RB offset.

The MCS offset or the RB offset may be indicated by signaling, and if indicated by using signaling, the MCS offset or the RB offset may be indicated by using physical layer signaling, or may be indicated by using RRC signaling. If indicated by using signaling, optionally, a value of the MCS offset or a value of the RB offset may be indicated directly by using signaling; or optionally, an index value corresponding to the MCS offset or the RB offset may be indicated by using signaling, and then the MCS offset or the RB offset may be obtained according to a correspondence between the index value and the MCS offset or the RB offset. A benefit of indicating by using the physical layer signaling is: an MCS or an occupied frequency resource corresponding to uplink data transmitted by the terminal device can be flexibly adjusted according to quality of a channel between the access network device and the terminal device, and efficient data transmission can be ensured. A benefit of indicating by using the RRC signaling is: if a change feature of the channel between the access network and the terminal device is relatively smooth, the MCS offset or the RB offset can be set by using the RRC signaling, and this can not only adapt to the change of the channel between the access network device and the terminal device, but also reduce physical layer signaling overheads.

Alternatively, the MCS offset or the RB offset may be preconfigured, for example, specified by a standard protocol. In this manner, signaling overheads are minimized. A change of the second MCS or the second RB may be obtained according to a change of the first MCS or the first RB.

In this manner, the first MCS may be indicated by signaling. The signaling may be physical layer signaling, or may be RRC signaling. For example, the first MCS may be carried in scheduling signaling for scheduling the terminal device to transmit uplink data in the M uplink subframes. A benefit of carrying in the scheduling signaling is: MCS indication information or RB indication information included in the existing scheduling information (for example, a UL grant) may be reused, so as to make design simple. A benefit of carrying in the RRC signaling is that physical layer signaling overheads can be reduced.

It should be pointed out that, the foregoing method for determining the first MCS or the first RB may be used in combination with the method for determining the second MCS or the second RB.

Optionally, an example of determining the first MCS is used to specifically describe the method for determining the first MCS and the second MCS.

In this implementation, one of the MCSs, for example, the first MCS, may be determined by using the MCS indication information included in the existing UL grant. Another MCS may be indicated by explicit signaling. For example, the second MCS is indicated by using a bit added to the UL grant. An indicating manner is that the added bit may directly indicate a result corresponding to the MCS, for example, a corresponding modulation order and/or transport block size (TBS) in Table 4. Another indicating manner is that the added bit may indicate an MCS index, and an MCS and a TBS are determined according to a correspondence between the index and a modulation mode and the transport block size (TBS). Another indicating manner is that an offset (corresponding to the MCS offset in this embodiment of the present disclosure) of the second MCS relative to the first MCS may be indicated by using the added bit. For example, different index information may be indicated by using different states of the added bit, and the different index information corresponds to different offsets on a one-to-one basis. Herein a set composed of different offsets may be semi-statically configured, for example, configured by using RRC signaling, or may be statically configured, for example, specified by a standard protocol. For another example, different offsets may be indicated directly by using the added bit.

In another manner, for example, the first MCS may be indicated by control information included in the UL grant, and the second MCS or the MCS offset between the second MCS and the first MCS is preconfigured, for example, specified by a standard protocol. In this case, the terminal device may determine the second MCS according to the first MCS and the preconfigured MCS offset.

It should be noted that, the manner described above is also applicable to determining the first RB and the second RB. Optionally, when the second RB is determined according to the first RB and the RB offset, the RB offset may be further understood as an increase or a decrease by an RB size indicated by the RB offset and an RB position, on a basis of the first RB, so that the second RB is determined. Optionally, when the first RB is determined according to the second RB and the RB offset, the RB offset may be further understood as an increase or a decrease by an RB size indicated by the RB offset and an RB position, on a basis of the second RB, so that the first RB is determined.

It should be noted that, in this embodiment of the present disclosure, the first RB (or the second RB) includes at least one of the following: a size of the first RB (or the second RB), and a frequency resource position occupied by the first RB (or the second RB).

It should be noted that, in this embodiment of the present disclosure, the first MCS (or the second MCS) may include at least one of the following: a modulation order and a transport block size.

TABLE 4

PUSCH modulation (Modulation) and transport block size (TBS) index

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | reserved | |
| 30 | | |
| 31 | | |

Corresponding to the foregoing method, the present disclosure provides a terminal device. The terminal device may be applied to a multi-subframe scheduling scenario in a U-LTE system, and the terminal device may perform each step in the foregoing method embodiment.

Figure 20:
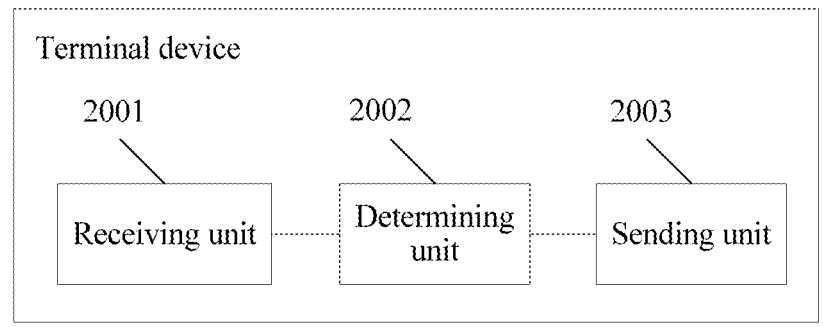
FIG. 20 is a schematic structural diagram of another embodiment of a terminal device according to an embodiment of the present disclosure.

Referring to FIG. 20, in an embodiment, the terminal device includes a receiving unit 2001, configured to receive scheduling information and trigger information from an access network device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The terminal device includes a determining unit 2002, configured to determine a first MCS or a first RB corresponding to the first uplink subframe set, and determine a second MCS or a second RB corresponding to the second uplink subframe set. The terminal device includes a sending unit 2003, configured to transmit, in the first uplink subframe set, the first uplink data corresponding to the first MCS or the first RB, and transmit, in the second uplink subframe set, the second uplink data and the uplink control information corresponding to the second MCS or the second RB.

In an embodiment, the second subframe set includes at least one of a last subframe in a time sequence of the M uplink subframes and a penultimate subframe in the time sequence.

In another embodiment, the terminal device receives the scheduling information in a subframe n; and the second subframe set includes at least one of a last uplink subframe and a penultimate uplink subframe in a time sequence of an uplink burst included in the M uplink subframes, where the uplink burst refers to multiple uplink subframes that are occupied consecutively in time, and the uplink burst is after a downlink burst including the subframe n and is immediately adjacent to the downlink burst including the subframe n.

In another embodiment, a quantity of OFDM symbols for transmitting uplink information in the uplink subframe in the second subframe set is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

Figure 21:
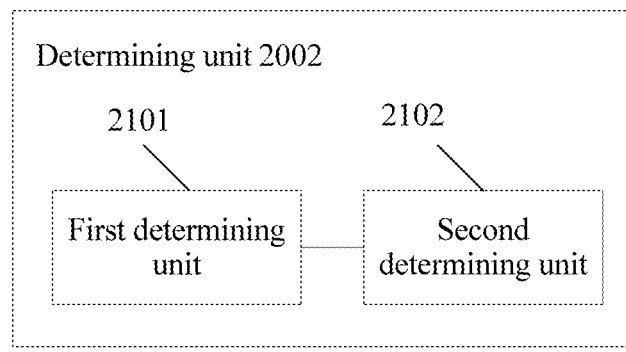
FIG. 21 to FIG. 23 are schematic structural diagrams of embodiments of a determining unit in a terminal device according to an embodiment of the present disclosure.

Referring to FIG. 21, in an embodiment, the receiving unit is further configured to receive first indication information from the access network device, where the first indication information is used to indicate the first MCS or the first RB. The determining unit includes: a first determining unit 2101, configured to determine the first MCS or the first RB according to the first indication information and a second determining unit 2102, configured to obtain an MCS offset or an RB offset, and determine the second MCS according to the first MCS and the MCS offset, or determine the second RB according to the first RB and the RB offset, where the MCS offset is an offset between the first MCS and the second MCS, and the RB offset is an offset between the first RB and the second RB.

Figure 22:
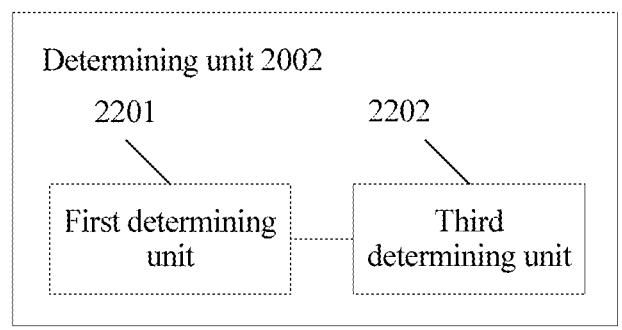

Referring to FIG. 22, the receiving unit is further configured to receive first indication information and second indication information from the access network device, where the first indication information is used to indicate the first MCS or the first RB. The determining unit includes: a first determining unit 2201, configured to determine the first MCS or the first RB according to the first indication information; and a third determining unit, where the third determining unit is configured to determine the second MCS or the second RB according to the second indication information.

Figure 23:
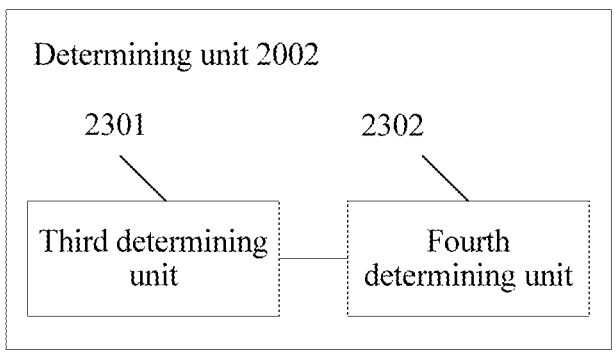

Referring to FIG. 23, in another embodiment, the receiving unit is further configured to receive second indication information from the access network device, where the second indication information is used to indicate the second MCS or the second RB. The determining unit includes: a third determining unit 2301, configured to determine the second MCS or the second RB according to the second indication information; and a fourth determining unit 2302, configured to obtain an MCS offset or an RB offset, and determine the first MCS according to the second MCS and the MCS offset, or determine, by the terminal device, the first RB according to the second RB and the RB offset, where the MCS offset is an offset between the first MCS and the second MCS, and the RB offset is an offset between the first RB and the second RB.

For definitions and functions of the scheduling information, the trigger information, the uplink control information, and the M uplink subframes in the terminal device embodiment, refer to related descriptions in the foregoing method embodiment. For specific implementation details about the method for determining an uplink subframe set and the method for obtaining the first MCS, the second MCS, the first RB, and the second RB in the terminal device embodiment, refer to related descriptions in the foregoing method embodiment.

Figure 24:
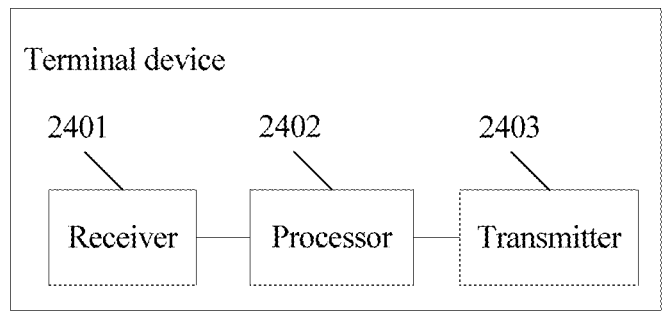
FIG. 24 is a schematic structural diagram of another embodiment of a terminal device according to an embodiment of the present disclosure.

Referring to FIG. 24, in another embodiment, the terminal device includes a receiver 2401, configured to receive scheduling information and trigger information from an access network device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The terminal device includes a processor 2402, configured to determine a first MCS or a first RB corresponding to the first uplink subframe set, and determine a second MCS or a second RB corresponding to the second uplink subframe set. The terminal device includes a transmitter 2403, configured to transmit, in the first uplink subframe set, the first uplink data corresponding to the first MCS or the first RB, and transmit, in the second uplink subframe set, the second uplink data and the uplink control information corresponding to the second MCS or the second RB.

Specific functions implemented by the processor in the terminal device are similar to functions of the determining unit 2002 in the foregoing embodiment. For specific implementation details about processing, refer to related descriptions in the foregoing embodiment.

For definitions and functions of the scheduling information, the trigger information, the uplink control information, and the M uplink subframes in the terminal device embodiment, refer to related descriptions in the foregoing method embodiment. For specific implementation details about the method for determining the second uplink subframe set and the method for obtaining the first MCS, the second MCS, the first RB, and the second RB in the terminal device embodiment, refer to related descriptions in the foregoing method embodiment.

In the foregoing embodiment, the second subframe set is used to transmit the uplink control information and uplink data. In another embodiment, the second subframe set may transmit only the uplink control information.

Figure 25:
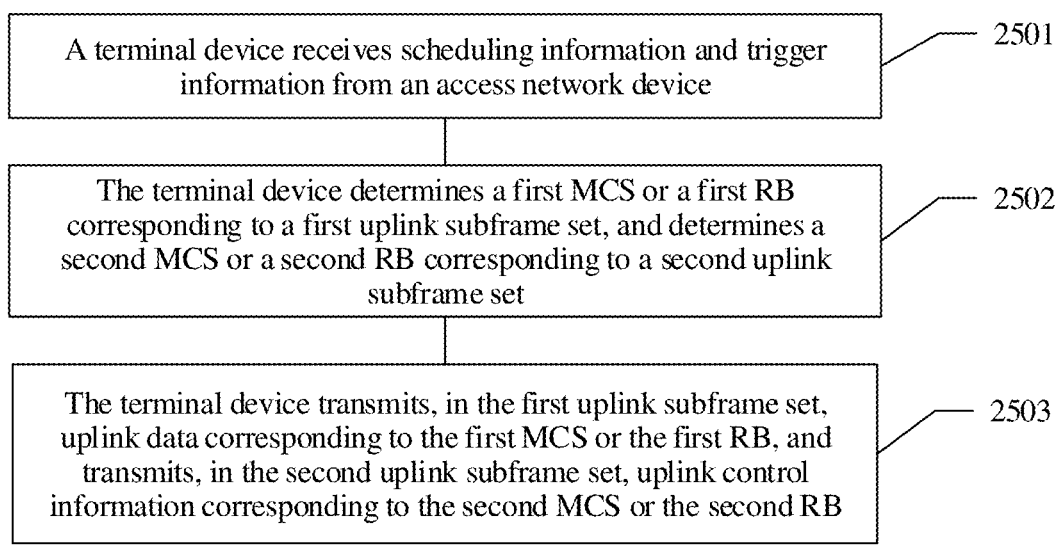
FIG. 25 is a schematic flowchart of a method for transmitting uplink control information according to another embodiment of the present disclosure.

Referring to FIG. 25, an embodiment of a method for transmitting uplink control information according to the present disclosure includes the following steps.

S2501. A terminal device receives scheduling information and trigger information from an access network device, where the scheduling information is used to instruct the terminal device to transmit scheduled uplink data in M uplink subframes, M is a positive integer not less than 2, and the trigger information is used to instruct the terminal device to send uplink control information.

The M uplink subframes include a first uplink subframe set and a second uplink subframe set, the first uplink subframe set and the second uplink subframe set respectively include at least one uplink subframe, the subframe in the first uplink subframe set is used to transmit the uplink data, and the subframe in the second uplink subframe set is used to transmit the uplink control information.

S2502. The terminal device determines a first MCS or a first RB corresponding to the first uplink subframe set, and determines a second MCS or a second RB corresponding to the second uplink subframe set.

S2503. The terminal device transmits, in the first uplink subframe set, the uplink data corresponding to the first MCS or the first RB, and transmits, in the second uplink subframe set, the uplink control information corresponding to the second MCS or the second RB.

For definitions and functions of the scheduling information, the trigger information, and the uplink control information in this embodiment, refer to related descriptions in Embodiment 1. Details are not further described herein.

The method for determining the second subframe set, the method for determining the first MCS or the first RB, and the method for determining the second MCS or the second RB are similar to those in the foregoing embodiment. Details are not further described herein.

In this embodiment, because the uplink subframe in the second uplink subframe set is used to transmit only the uplink control information, a resource waste problem does not exist in the uplink subframe that includes only the uplink data to reduce signaling overheads. In this embodiment, optionally, when overheads of the uplink control information transmitted by the terminal device are relatively high, for example, when CSI corresponding to multiple serving cells or multiple CSI processes are to be fed back, and/or when HARQ-ACKs corresponding to multiple serving cells and/or multiple downlink subframes are to be fed back, it may be specified that the uplink subframe in the second uplink subframe set is used to transmit only the uplink control information. Therefore, not only the benefits described above can be obtained (that is, a resource waste problem in an uplink subframe including only uplink data is reduced), but also a resource waste in an uplink subframe including only uplink control data is reduced.

Corresponding to the foregoing method, the present disclosure provides a terminal device. The terminal device may be applied to a multi-subframe scheduling scenario in a U-LTE system, and the terminal device may perform each step in the foregoing method embodiment.

Figure 26:
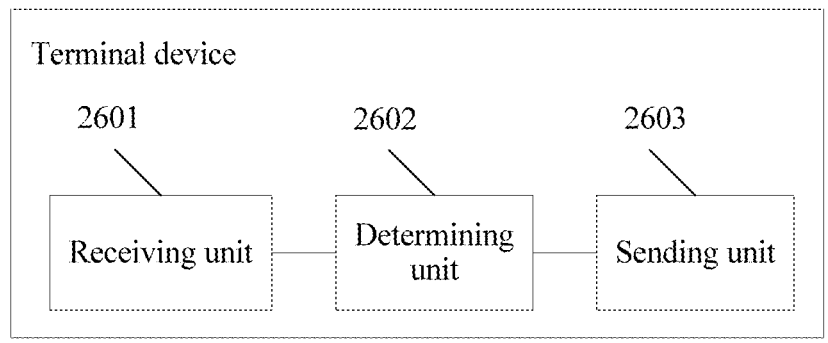
FIG. 26 is a schematic structural diagram of another embodiment of a terminal device according to an embodiment of the present disclosure.

Referring to FIG. 26, in an embodiment, the terminal device includes: a receiving unit 2601, configured to receive scheduling information and trigger information from an access network device, where the scheduling information is used to instruct the terminal device to transmit scheduled uplink data in M uplink subframes, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the uplink data, and the subframe in the second uplink subframe set is used to transmit the uplink control information. The terminal device includes a determining unit 2602, configured to determine a first MCS or a first RB corresponding to the first uplink subframe set, and determine a second MCS or a second RB corresponding to the second uplink subframe set. The terminal device includes a sending unit 2603, configured to transmit, in the first uplink subframe set, the uplink data corresponding to the first MCS or the first RB, and transmit, in the second uplink subframe set, the uplink control information corresponding to the second MCS or the second RB.

For definitions and functions of the scheduling information, the trigger information, and the uplink control information in this embodiment, refer to related descriptions in Embodiment 1. Details are not further described herein.

The method for determining the second subframe set, the method for determining the first MCS or the first RB, and the method for determining the second MCS or the second RB are similar to those in the foregoing embodiment. Details are not further described herein.

Figure 27:
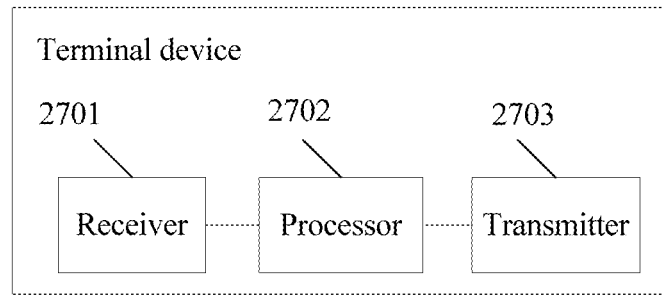
FIG. 27 is a schematic structural diagram of another embodiment of a terminal device according to an embodiment of the present disclosure.

Referring to FIG. 27, in another embodiment, the terminal device includes a receiver 2701, configured to receive scheduling information and trigger information from an access network device, where the scheduling information is used to instruct the terminal device to transmit scheduled uplink data in M uplink subframes, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the uplink data, and the subframe in the second uplink subframe set is used to transmit the uplink control information. The terminal device includes a processor 2702, configured to determine a first MCS or a first RB corresponding to the first uplink subframe set, and determine a second MCS or a second RB corresponding to the second uplink subframe set. The terminal device includes a transmitter 2703, configured to transmit, in the first uplink subframe set, the uplink data corresponding to the first MCS or the first RB, and transmit, in the second uplink subframe set, the uplink control information corresponding to the second MCS or the second RB.

For definitions and functions of the scheduling information, the trigger information, and the uplink control information in this embodiment, refer to related descriptions in Embodiment 1. Details are not further described herein.

The method for determining the second subframe set, the method for determining the first MCS or the first RB, and the method for determining the second MCS or the second RB are similar to those in the foregoing embodiment. Details are not further described herein.

To improve resource utilization, the present disclosure provides an embodiment of a method for transmitting uplink control information. This embodiment may be applied to a multi-subframe scheduling scenario in a U-LTE system.

Figure 28:
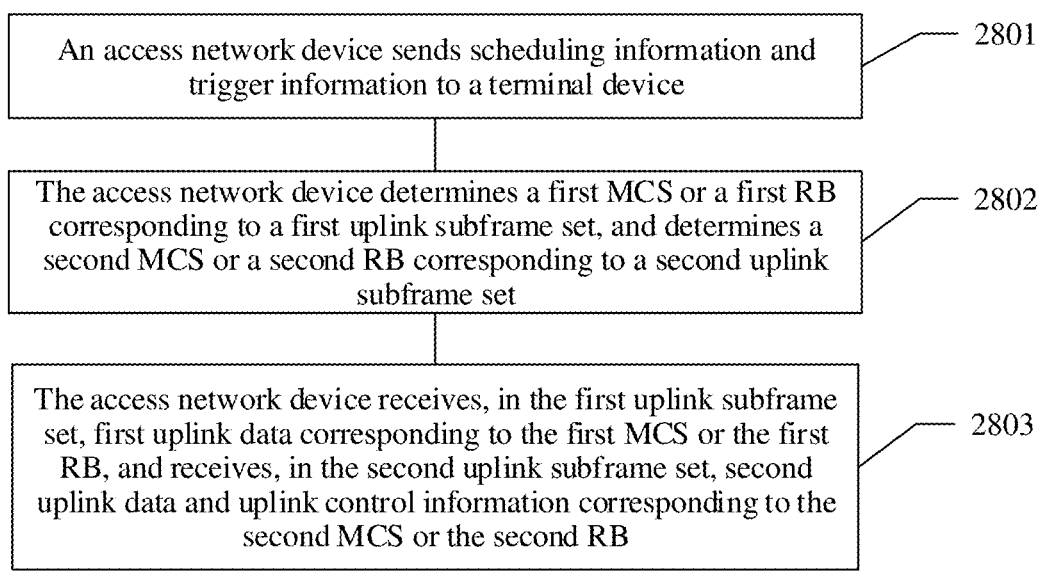
FIG. 28 is a schematic flowchart of a method for transmitting uplink control information according to another embodiment of the present disclosure.

Referring to FIG. 28, an embodiment of a method for transmitting uplink control information according to the present disclosure includes the following steps.

S2801. An access network device sends scheduling information and trigger information to a terminal device, where the scheduling information is used to instruct the terminal device to transmit scheduled uplink data in M uplink subframes, the uplink data includes first uplink data and second uplink data, M is a positive integer not less than 2, and the trigger information is used to instruct the terminal device to send uplink control information.

The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data.

S2802. The access network device determines a first MCS or a first RB corresponding to the first uplink subframe set, and determines a second MCS or a second RB corresponding to the second uplink subframe set.

S2803. The access network device receives, in the first uplink subframe set, the first uplink data corresponding to the first MCS or the first RB, and receives, in the second uplink subframe set, the uplink control information and the second uplink data corresponding to the second MCS or the second RB.

For definitions and functions of the scheduling information, the trigger information, and the uplink control information in this embodiment, refer to related descriptions in Embodiment 1. Details are not further described herein.

The first MCS or the first RB and the second MCS or the second RB may be preconfigured in the access network device, or may be notified to the terminal device after being selected and determined by the access network device. The access network device may notify the first MCS or the first RB and the second MCS or the second RB to the terminal device in multiple manners.

In an embodiment, the access network device may send first indication information and second indication information to the terminal device, where the first indication information includes information indicating the first MCS or the first RB, and the second indication information includes information indicating the second MCS or the second RB. Optionally, the first indication information and the second indication information may be carried in a same message.

In another embodiment, the access network device may send one of the first indication information and the second indication information to the terminal device, and send offset information to the terminal device. The first indication information includes information indicating the first MCS or the first RB, and the second indication information includes information indicating the second MCS or the second RB. The offset information is an offset between the first MCS and the second MCS or an offset between the first RB and the second RB. Optionally, the indication information and the offset information may be carried in a same message.

It should be noted that, in this embodiment of the present disclosure, the terminal device sends uplink information in a subframe n. Considering a propagation delay between the terminal device and the access network device, time for receiving the uplink information by the access network device falls behind a subframe start boundary of the subframe n. However, for ease of description, in this embodiment of the present disclosure, it may also be described as "the access network device receives the uplink information in the subframe n".

For the method for determining the second uplink subframe set and the method for obtaining the first MCS, the second MCS, the first RB, and the second RB in this embodiment, refer to related descriptions in the method embodiment corresponding to the terminal device in Embodiment 3. Details are not further described herein.

Corresponding to the foregoing method, the present disclosure provides an access network device. The access network device may be applied to a multi-subframe scheduling scenario in an LAA-LTE system, and the access network device may perform each step in the foregoing method embodiment.

Figure 29:
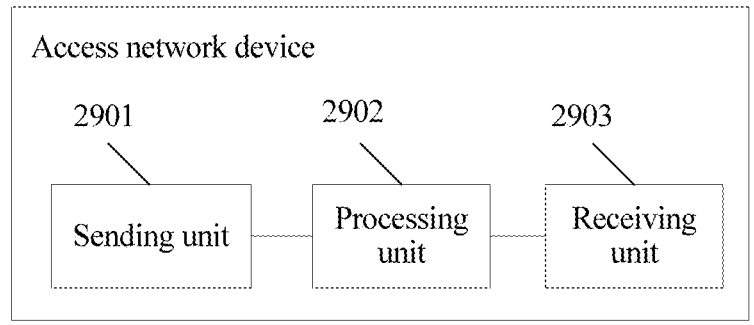
FIG. 29 is a schematic structural diagram of an embodiment of an access network device according to an embodiment of the present disclosure.

Referring to FIG. 29, in an embodiment, the access network device includes a sending unit 2901, configured to send scheduling information and trigger information to a terminal device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The access network device includes a processing unit 2902, configured to determine a first MCS or a first RB corresponding to the first uplink subframe set, and determine a second MCS or a second RB corresponding to the second uplink subframe set. The access network device includes a receiving unit 2903, configured to receive, in the first uplink subframe set, the first uplink data corresponding to the first MCS or the first RB, and receive, in the second uplink subframe set, the second uplink data and the uplink control information corresponding to the second MCS or the second RB.

In an embodiment, the second subframe set includes at least one of a last subframe in a time sequence of the M uplink subframes and a penultimate subframe in the time sequence.

In an embodiment, the access network device sends the scheduling information in a subframe n; and the second subframe set includes at least one of a last uplink subframe and a penultimate uplink subframe in a time sequence of an uplink burst, where the uplink burst refers to multiple uplink subframes that are occupied consecutively in time, and the uplink burst is after a downlink burst including the subframe n and is immediately adjacent to the downlink burst including the subframe n.

In an embodiment, a quantity of OFDM symbols for transmitting uplink information in the uplink subframe in the second subframe set is not less than a specified threshold.

In an embodiment, the scheduling information and the trigger information are carried in same downlink control information.

In an embodiment, the uplink control information includes at least one of channel state information, a sounding reference signal, and a hybrid automatic repeat request acknowledgement.

In an embodiment, the sending unit is further configured to send first indication information to the terminal device, where the first indication information is used to indicate the first MCS or the first RB.

In an embodiment, the sending unit is further configured to send second indication information to the terminal device, where the second indication information is indication information used to indicate the second MCS or the second RB.

In an embodiment, the sending unit is further configured to send an MCS offset or an RB offset to the terminal device, where the MCS offset is an offset between the first MCS and the second MCS, and the RB offset is an offset between the first RB and the second RB.

For definitions and functions of the scheduling information, the trigger information, the uplink control information, and the M uplink subframes in this embodiment, refer to related descriptions in the foregoing method embodiment. For the method for determining the second uplink subframe set and the method for obtaining the first MCS, the second MCS, the first RB, and the second RB in this embodiment, refer to related descriptions in the foregoing method embodiment.

Figure 30:
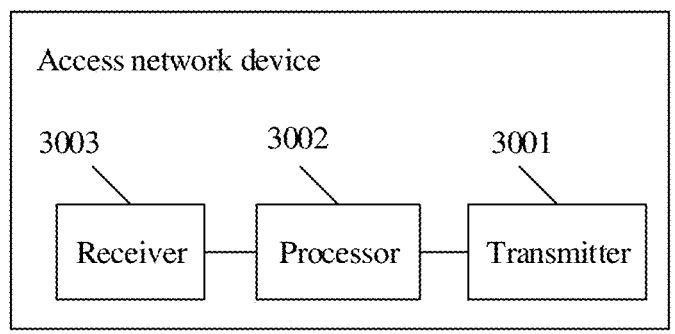
FIG. 30 is a schematic structural diagram of an embodiment of an access network device according to an embodiment of the present disclosure.

Referring to FIG. 30, in another embodiment, the access network device includes a transmitter 3001, configured to send scheduling information and trigger information to a terminal device, where the scheduling information is used to instruct the terminal device to transmit, in M uplink subframes, uplink data scheduled by the scheduling information, the uplink data includes first uplink data and second uplink data, M is a positive integer not less than 2, and the trigger information is used to instruct the terminal device to send uplink control information. The M uplink subframes include a first uplink subframe set and a second uplink subframe set, the first uplink subframe set and the second uplink subframe set respectively include at least one uplink subframe, the subframe in the first uplink subframe set is used to transmit the first uplink data, and the subframe in the second uplink subframe set is used to transmit the uplink control information and the second uplink data. The access network device includes a processor 3002, configured to determine a first MCS or a first RB corresponding to the first uplink subframe set, and determine a second MCS or a second RB corresponding to the second uplink subframe set. The access network device includes a receiver 3003, configured to receive, in the first uplink subframe set, the first uplink data corresponding to the first MCS or the first RB, and receive, in the second uplink subframe set, the second uplink data and the uplink control information corresponding to the second MCS or the second RB.

Specific functions of the transmitter, the processor, and the receiver in this embodiment are respectively similar to those of the sending unit, the processing unit, and the receiving unit in the foregoing embodiment.

For definitions and functions of the scheduling information, the trigger information, the uplink control information, and the M uplink subframes in this embodiment, refer to related descriptions in the foregoing method embodiment. For the method for determining the second uplink subframe set and the method for obtaining the first MCS, the second MCS, the first RB, and the second RB in this embodiment, refer to related descriptions in the foregoing method embodiment.

Embodiment 4

A terminal device receives scheduling information and trigger information from an access network device, where the scheduling information is used to instruct the terminal device to transmit, in M uplink subframes, uplink data scheduled by the scheduling information, M is a positive integer not less than 2, and the trigger information is used to instruct the terminal device to send uplink control information.

The terminal device determines, in the M uplink subframes, an uplink subframe for carrying the uplink control information, where the determined uplink subframe is a first uplink subframe in which an unlicensed spectrum resource is obtained through contention in the M uplink subframes.

The terminal device sends the uplink control information in the determined uplink subframe.

Figure 31:
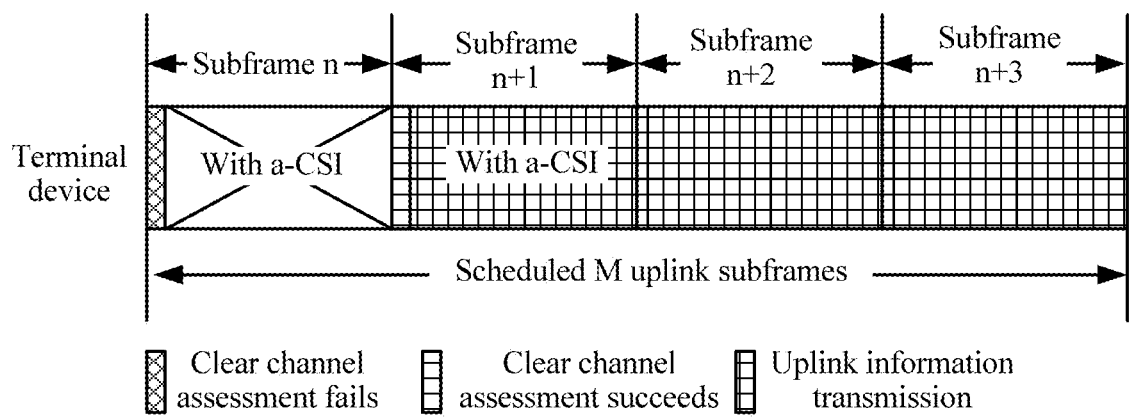
FIG. 31 is a schematic diagram of another relationship between subframes in multi-subframe scheduling.

In this embodiment of the present disclosure, the terminal device may determine, according to the scheduling information, to transmit the uplink data in an uplink subframe n to an uplink subframe n+3, as shown in FIG. 31.

In FIG. 31, if the terminal device obtains an unlicensed spectrum resource through contention in the subframe n by performing a CCA, the terminal device transmits the uplink control information in the subframe n. If the terminal device fails to obtain an unlicensed spectrum resource through contention in the subframe n but obtains an unlicensed spectrum resource through contention in the subframe n+1, the terminal device may transmit the uplink control information in the subframe n+1. Further, all of the subframe n to the subframe n+3 may be used as uplink subframes that may transmit the uplink control information.

The method in this embodiment of the present disclosure may also be used to report the uplink control information in multiple candidate positions, so as to ensure an opportunity for transmitting the uplink control information.

Embodiment 5

A terminal device receives scheduling information from an access network device, where the scheduling information is used to instruct the terminal device to transmit, in M uplink subframes, uplink data scheduled by the scheduling information, the uplink data includes first uplink data and second uplink data, M is a positive integer not less than 2, the M uplink subframes include a first uplink subframe and a second uplink subframe, and a quantity of resource elements (RE) for transmitting uplink data in the first uplink subframe is different from a quantity of resource elements REs for transmitting uplink data in the second uplink subframe.

The terminal device determines a first MCS or a first RB corresponding to the first uplink subframe, and determines a second MCS or a second RB corresponding to the second uplink subframe.

The terminal device transmits, in the first uplink subframe, the first uplink data corresponding to the first MCS or the first RB, and transmits, in the second uplink subframe, the second uplink data corresponding to the second MCS or the second RB.

In multi-subframe scheduling, in addition to CSI transmission in the uplink subframe mentioned in the foregoing embodiment, SRS transmission in the uplink subframe or HARQ-ACK transmission in the uplink subframe may cause quantities of resource elements that are used for uplink data transmission and included in at least two uplink subframes in the M scheduled uplink subframes to be different. Considering that multi-user multiplexing and/or reservation of a CCA gap in a subframe may also cause the quantities of resource elements that are used for uplink data transmission and included in the at least two uplink subframes in the M scheduled uplink subframes to be different, optionally, a representation form of different quantities of resource elements is that quantities of OFDM symbols for transmitting uplink information in different uplink subframes are different, or in other words, there are cases in which different uplink subframes include or do not include blank OFDM symbols, or specific quantities of blank OFDM symbols included in the uplink subframes are different. For example, as shown in FIG. 4, in four scheduled uplink subframes, a quantity of OFDM symbols for transmitting uplink information in a subframe n+7 is less than a quantity of OFDM symbols for transmitting uplink information in another subframe (such as a subframe n+4, a subframe n+5, or a subframe n+6), or there is a blank OFDM symbol for uplink information transmission in the subframe n+7. In this case, for uplink data carried in different uplink subframes, MCSs or RBs corresponding to the uplink data transmission can be set to ensure data transmission efficiency.

As described above, the terminal device may directly determine the first MCS or the first RB, and directly determine the second MCS or the second RB; or may directly determine the first MCS or the first RB, and then determine the second MCS by using an MCS offset between the first MCS and the second MCS, or determine the second RB by using an offset between the first RB and the second RB; or may directly determine the second MCS or the second RB, and then determine the first MCS by using an MCS offset between the first MCS and the second MCS, or determine the first RB by using an RB offset between the first RB and the second RB.

In this manner, implementations of determining the first MCS, the second MCS, the first RB, and the second RB, and determining the MCS offset between the first MCS and the second MCS and the RB offset between the first RB and the second RB are the same as those described above. Details are not further described herein.

Correspondingly, in this implementation, the access network device sends the scheduling information to the access network device, where the scheduling information is used to instruct the terminal device to transmit, in the M uplink subframes, the uplink data scheduled by the scheduling information, the uplink data includes the first uplink data and the second uplink data, M is a positive integer not less than 2, the M uplink subframes include the first uplink subframe and the second uplink subframe, and the quantity of resource elements (Resource Element, RE) for transmitting uplink data in the first uplink subframe is different from the quantity of resource elements REs for transmitting uplink data in the second uplink subframe.

The access network device determines the first MCS or the first RB corresponding to the first uplink subframe, and determines the second MCS or the second RB corresponding to the second uplink subframe.

The access network device receives, in the first uplink subframe, the first uplink data corresponding to the first MCS or the first RB, and receives, in the second uplink subframe, the second uplink data corresponding to the second MCS or the second RB.

It should be noted that, in this embodiment of the present disclosure, RRC signaling may be understood as higher layer signaling.

It should be noted that, in this embodiment of the present disclosure, the terminal device receives, in a subframe n, a piece of scheduling information sent by the access network device, or receives a piece of UL grant information, where the scheduling information instructs the terminal device to transmit, in at least two uplink subframes, uplink data scheduled by the scheduling information. In this embodiment of the present disclosure, optionally, the terminal device receives, in the subframe n, multiple pieces of scheduling information sent by the access network device, where the multiple pieces of scheduling information may be carried in different DCI, but may be carried in the same subframe, or in other words, the terminal device receives multiple pieces of UL grant information. In this case, uplink subframes corresponding to the multiple pieces of scheduling information may be considered as M uplink subframes. The uplink subframe corresponding to the scheduling information means that the scheduling information is used to instruct the terminal device to transmit uplink data in the uplink subframe.

It should be noted that, in this embodiment of the present disclosure, if the terminal device receives, in the subframe n, multiple pieces of scheduling information sent by the access network device where the multiple pieces of scheduling information are carried in different DCI, the uplink subframe determined by the terminal device and used to carry uplink control information is one of multiple uplink subframes scheduled by scheduling information that is in the same DCI as the trigger information.

In this embodiment of the present disclosure, optionally, the M uplink subframes may be consecutive in a time sequence, or optionally, the M uplink subframes may not be consecutive in a time sequence.

It should be noted that, in this embodiment of the present disclosure, the uplink subframe for carrying the uplink control information may be indicated by signaling, or may be determined according to a preconfigured rule, where the preconfigured rule may, for example, include the foregoing implementations.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. For example, the receiver and the transmitter may be physically integrated into one module, for example, a transceiver or an antenna.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

In short, the foregoing descriptions are merely example embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:
1. A method, comprising:
receiving, by a terminal device, scheduling information and trigger information from an access network device, wherein the scheduling information instructs the terminal device to transmit uplink data in M uplink subframes, M is a positive integer not less than 2, the trigger information instructs the terminal device to send uplink control information, and the uplink control information is different from the uplink data;

determine, according to a first contention mechanism performed by the terminal prior to transmitting at least uplink control information in an unlicensed spectrum, that a channel is clear for sending the uplink control information;

determine, by the terminal device, one control uplink subframe in the M uplink subframes for carrying an entirety of the uplink control information, according to the determination that the channel is clear for sending the uplink control information, wherein the control uplink subframe is a subframe other than an earliest subframe in a time sequence of the M uplink subframes, wherein the control uplink subframe is determined by the terminal device in response to determining the one control uplink subframe is not a subframe in which a second contention mechanism is performed by the access network device directly before sending downlink data, wherein the M uplink subframes are scheduled for a time immediately prior to a scheduled time of subframes for the sending the downlink data, and wherein the first contention mechanism and the second contention mechanism are performed by different devices and for different transmission directions; and sending, by the terminal device, the uplink control information in the control uplink subframe.

2. The method according to claim 1, wherein the control uplink subframe is a last subframe in the time sequence of the M uplink subframes or a penultimate subframe in the time sequence of the M uplink subframes.

3. The method according to claim 1, wherein:
the terminal device receives the scheduling information in a subframe n; and
the control uplink subframe is a last or penultimate uplink subframe in a time sequence of an uplink burst comprised in the M uplink subframes, wherein the uplink burst comprises a plurality of uplink subframes that are occupied consecutively in time, and the uplink burst is after and immediately adjacent to a downlink burst comprising the subframe n.

4. The method according to claim 1, wherein a quantity of OFDM symbols for the uplink control information transmitted in the control uplink subframe is not less than a specified threshold.

5. The method according to claim 1, wherein the scheduling information and the trigger information are carried in same downlink control information.

6. The method according to claim 1, wherein the uplink control information comprises channel state information, a sounding reference signal, or a hybrid automatic repeat request acknowledgement.

7. A terminal device, comprising:
a receiver;
a transmitter;
a processor;
a non-transitory computer-readable storage medium storing a program to be executed by the processor, the program including instructions for:
receiving, via the receiver, scheduling information and trigger information from an access network device, wherein the scheduling information instructs the terminal device to transmit uplink data in M uplink subframes, M is a positive integer not less than 2, the trigger information instructs the terminal device to send uplink control information, and the uplink control information is different from the uplink data;

determine, according to a first contention mechanism performed prior to transmitting at least uplink control information in an unlicensed spectrum, that a channel is clear for sending the uplink control information;

determining one control uplink subframe in the M uplink subframes for carrying an entirety of the uplink control information, according to the determination that the channel is clear for sending the uplink control information, wherein the control uplink subframe is a subframe other than an earliest subframe in a time sequence of the M uplink subframes, wherein the control uplink subframe is determined by the terminal device in response to determining the one control uplink subframe is not a subframe in which a second contention mechanism is performed by the access network device directly before sending downlink data, wherein the M uplink subframes are scheduled for a time immediately prior to a scheduled time of subframes for the sending the downlink data, and wherein the first contention mechanism and the second contention mechanism are performed by different devices and for different transmission directions; and sending, via the transmitter, the uplink control information in the control uplink subframe.

8. The terminal device according to claim 7, wherein the control uplink subframe is a last subframe in the time sequence of the M uplink subframes or a penultimate subframe in the time sequence of the M uplink subframes.

9. The terminal device according to claim 7, wherein:
the receiver receives the scheduling information in a subframe n; and
the instructions comprise further instructions to determine a last or penultimate uplink subframe in a time sequence of an uplink burst comprised in the M uplink subframes as the control uplink subframe, wherein the uplink burst is a plurality of uplink subframes that are occupied consecutively in time, and the uplink burst is after and immediately adjacent to a downlink burst comprising the subframe n.

10. The terminal device according to claim 7, wherein a quantity of OFDM symbols for transmitting the uplink control information in the control uplink subframe is not less than a specified threshold.

11. The terminal device according to claim 7, wherein the scheduling information and the trigger information are carried in same downlink control information.

12. The terminal device according to claim 7, wherein the uplink control information comprises channel state information, a sounding reference signal, or a hybrid automatic repeat request acknowledgement.

13. An access device, comprising:
a transmitter;
a receiver;
a processor;
a non-transitory computer-readable storage medium storing a program to be executed by the processor, the program including instructions for:
sending, via the transmitter, scheduling information and trigger information to a terminal device, wherein the scheduling information instructs the terminal device to transmit, uplink data scheduled in M uplink subframes, M is a positive integer not less than 2, the trigger information instructs the terminal device to send uplink control information, and the uplink control information is different from the uplink data; and
receiving, via the receiver, the uplink control information in one control uplink subframe, wherein the control uplink subframe carries an entirety of the uplink control information, the control uplink subframe is a subframe other than an earliest subframe in a time sequence of the M uplink subframes, the control uplink subframe is sent in a subframe according to a first determination that a channel is clear for sending the uplink control information, the control uplink subframe is determined by the terminal device in response to determining the one control uplink subframe is not a subframe in which a second determination that a channel is clear for sending is performed by the access device directly before sending downlink data, wherein the M uplink subframes are scheduled for a time immediately prior to a scheduled time of subframes for the sending the downlink data, and the first determination that a channel is clear for sending and the second determination that a channel is clear for sending are performed by different devices and for different transmission directions.

14. The access device according to claim 13, wherein the control uplink subframe is a last subframe in the time sequence of the M uplink subframes or a penultimate subframe in the time sequence of the M uplink subframes.

15. The access device according to claim 13, wherein the scheduling information and the trigger information are carried in same downlink control information.

16. The access device according to claim 13, wherein the uplink control information comprises channel state information, a sounding reference signal, or a hybrid automatic repeat request acknowledgement.

17. The access device according to claim 13, wherein the transmitter is further configured to:
  send the scheduling information in a subframe n, wherein the control uplink subframe is a last or penultimate uplink subframe in a time sequence of an uplink burst comprised in the M uplink subframes, wherein the uplink burst is a plurality of uplink subframes that are occupied consecutively in time, and the uplink burst is after and immediately adjacent to a downlink burst comprising the subframe n.

18. The access device according to claim 13, wherein a quantity of OFDM symbols for transmitting the uplink control information in the control uplink subframe is not less than a specified threshold.

* * * * *